(12) United States Patent
Simpson et al.

(10) Patent No.: US 11,407,499 B2
(45) Date of Patent: *Aug. 9, 2022

(54) AIRCRAFT LANDING GEAR HAVING A LEVER ASSEMBLY, AIRCRAFT INCLUDING THE SAME, AND RELATED METHODS

(71) Applicant: The Boeing Company, Chicago, IL (US)

(72) Inventors: Mark Nicholas Simpson, Kirkland, WA (US); Mitchell Loren Ray Mellor, Bothell, WA (US); James E. Cusworth, Snohomish, WA (US); Justin Cottet, Snohomish, WA (US); Richard Kevin Johnson, Camano Island, WA (US); George Sonnenburg, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 314 days.

This patent is subject to a terminal disclaimer.

(21) Appl. No.: 16/789,190

(22) Filed: Feb. 12, 2020

(65) Prior Publication Data

US 2020/0198773 A1    Jun. 25, 2020

Related U.S. Application Data

(63) Continuation of application No. 15/445,652, filed on Feb. 28, 2017, now Pat. No. 10,597,146.

(51) Int. Cl.
*B64C 25/20* (2006.01)
*B64C 25/10* (2006.01)
(Continued)

(52) U.S. Cl.
CPC .............. *B64C 25/20* (2013.01); *B64C 25/10* (2013.01); *B64C 25/14* (2013.01); *B64C 25/26* (2013.01);
(Continued)

(58) Field of Classification Search
CPC ................................................ B64C 2025/008
See application file for complete search history.

(56) References Cited

U.S. PATENT DOCUMENTS

| 2,174,315 A | 9/1939 | Dowty |
| 2,319,446 A | 5/1943 | Dowty |

(Continued)

FOREIGN PATENT DOCUMENTS

| EP | 2138398 | 12/2009 |
| GB | 2057629 | 4/1981 |
| WO | WO 2011/119283 | 9/2011 |

OTHER PUBLICATIONS

Patent Office for the Cooperation Council for the Arab States of the Gulf, Examination Report for related GC Application No. GC 2018-34840, dated Dec. 16, 2019.

(Continued)

*Primary Examiner* — Joseph W Sanderson
(74) *Attorney, Agent, or Firm* — Dascenzo Gates Intellectual Property Law, P.C.

(57) ABSTRACT

An aircraft landing gear structure includes a strut assembly and a wheel assembly operatively coupled to the strut assembly. The strut assembly includes an upper tubular housing and a lower tubular housing configured to be longitudinally translated with respect to the upper tubular housing such that the overall length of the strut assembly is transitioned between an extended configuration and a retracted configuration for stowage during flight. The wheel assembly includes a forward link pivotally coupled to the upper tubular housing and a truck beam that is pivotally coupled to the lower tubular housing such that translation of the lower tubular housing with respect to the upper tubular housing causes pivoting of the forward link and the truck beam with respect to one another, thereby tilting and/or (Continued)

raising a wheel of the wheel assembly with respect to the upper tubular housing.

20 Claims, 13 Drawing Sheets

(51) Int. Cl.
  *B64C 25/00* (2006.01)
  *B64C 25/14* (2006.01)
  *B64C 25/26* (2006.01)
  *B64C 25/34* (2006.01)
  *B64C 25/60* (2006.01)

(52) U.S. Cl.
  CPC .............. *B64C 25/34* (2013.01); *B64C 25/60* (2013.01); *B64C 2025/008* (2013.01)

(56) References Cited

U.S. PATENT DOCUMENTS

| | | |
|---|---|---|
| 2,467,015 A | 4/1949 | Dreifke |
| 2,754,072 A | 7/1956 | Shapiro |
| 2,868,482 A | 1/1959 | Westcott, Jr. |
| 2,892,626 A | 6/1959 | Scott et al. |
| 3,580,531 A | 5/1971 | Bock et al. |
| 4,004,762 A | 1/1977 | Jenkins |
| 4,561,612 A | 12/1985 | Masclet |
| 4,749,152 A | 6/1988 | Veaux et al. |
| 4,907,760 A | 3/1990 | Sealey et al. |
| 5,279,480 A | 1/1994 | Derrien |
| 5,299,761 A | 4/1994 | Robin et al. |
| 6,182,925 B1 | 2/2001 | Kilner et al. |
| 8,448,900 B2 | 5/2013 | Mellor et al. |
| 8,973,725 B2 | 3/2015 | Lavigne et al. |
| 8,998,133 B2 | 4/2015 | Cottet |
| 9,308,989 B2 | 4/2016 | Otto |
| 9,321,525 B2 | 4/2016 | Luce |
| 9,481,452 B2 | 11/2016 | Lindahl et al. |
| 9,796,468 B2 | 10/2017 | Thompson |
| 9,868,518 B2 | 1/2018 | Elliott |
| 2009/0050736 A1 | 2/2009 | Bennett et al. |
| 2010/0219290 A1 | 9/2010 | Luce |
| 2011/0233328 A1 | 9/2011 | Alleau et al. |
| 2014/0197276 A1* | 7/2014 | Otto .......................... B64C 9/20 244/102 A |
| 2015/0101480 A1* | 4/2015 | Luce ....................... B64C 25/18 92/61 |
| 2016/0023750 A1* | 1/2016 | Thompson .............. B64C 25/62 244/102 A |
| 2016/0052623 A1* | 2/2016 | Elliott ..................... B64C 25/50 244/102 R |
| 2018/0001998 A1 | 1/2018 | Bennett |
| 2018/0244371 A1 | 8/2018 | Simpson et al. |
| 2018/0244372 A1 | 8/2018 | Simpson et al. |
| 2018/0244373 A1* | 8/2018 | Mellor .................... B64C 25/20 |
| 2018/0346102 A1* | 12/2018 | Dahl ....................... B64C 25/04 |

OTHER PUBLICATIONS

Federal Aviation Administration, Aviation Maintenance Technician Handbook—Airframe, Chapter 13, (2012), downloaded from faa.gov on Aug. 9, 2016.
Korean Patent Office, Non-final Office Action for related Korean patent application No. KR 10-2018-0024019 dated Apr. 25, 2022.
Machine generated English language translation of Non-final Office Action for KR 10-2018-0024019, dated Apr. 25, 2022.

* cited by examiner

AIRCRAFT LANDING GEAR HAVING A LEVER ASSEMBLY, AIRCRAFT INCLUDING THE SAME, AND RELATED METHODS

RELATED APPLICATION

This application claims priority to and is a continuation of U.S. patent application Ser. No. 15/445,652, filed on Feb. 28, 2017 and entitled AIRCRAFT LANDING GEAR HAVING A LEVER ASSEMBLY, AIRCRAFT INCLUDING THE SAME, AND RELATED METHODS, which issued as U.S. Pat. No. 10,597,146 on Mar. 24, 2020, the entire disclosure of which is incorporated herein by reference.

FIELD

The present disclosure relates to aircraft landing gear.

BACKGROUND

Aircraft with one or more of large engine fan diameters, long fuselages, long wings, and specialized under-aircraft payloads, for example, may require a tall landing gear structure to provide ground clearance to the engine and sufficient clearance to the tail during take-off. While the aircraft is in flight, the landing gear structures generally are stored within corresponding wheel wells in the fuselage of the aircraft. Integrating larger landing gear structures into the aircraft may impose expensive design constraints on the aircraft and also may add weight, which in turn requires greater fuel consumption by the aircraft.

Landing gear structures on aircraft generally employ an oleo strut shock absorber, in which a piston compresses a volume that includes both a compressible gas and a substantially incompressible liquid. The volume includes two chambers separated by an orifice through which the liquid flows, such that the overall structure provides both resilient shock absorption and dampening of the oscillation of the oleo strut shock absorber. Typically, such landing gear structures include a main fitting (e.g., an outer tube), a piston (e.g., an inner tube), and a sliding tube cylinder, thus involving three tubes/cylinders. A landing gear structure that includes an oleo strut shock absorber may be compressed into a retracted configuration for stowage in the wheel well during flight. However, achieving the retracted configuration may require compressing the compressible gas to an undesirably high pressure. Additionally, such landing gear structures tend to be heavy and complex, thus creating potential disadvantages from aircraft economy, maintenance, and manufacture standpoints.

SUMMARY

Aircraft landing gear structures according to the present disclosure include a strut assembly and a lever assembly operatively coupled thereto. The strut assembly includes a lower tubular housing operatively coupled to an upper tubular housing such that the lower tubular housing is longitudinally translatable with respect to the upper tubular housing as the strut assembly transitions between an extended configuration, a compressed configuration, and a retracted configuration. The strut assembly also includes a shrink mechanism configured to selectively transition the strut assembly to the retracted configuration. The lever assembly includes a forward link pivotally coupled to the upper tubular housing and a truck beam pivotally coupled to the forward link and to the lower tubular housing. Longitudinal translation of the lower tubular housing with respect to the upper tubular housing also causes pivoting of the forward link and the truck beam with respect to one another, as the strut assembly is transitioned between the extended configuration and the retracted configuration. In some examples, the pivoting of the forward link and the truck beam raises and/or tilts a wheel assembly of the aircraft landing gear structure with respect to the upper tubular housing.

Related methods include providing the aircraft landing gear structure according to the present disclosure and/or an aircraft including the same, shrinking the strut assembly to the retracted configuration, and retracting the aircraft landing gear into the aircraft for stowage during flight. In presently disclosed methods, shrinking the strut assembly to the retracted configuration also causes the forward link and truck beam of the lever assembly to pivot with respect to one another, thereby raising and/or tilting the wheel assembly with respect to the upper tubular housing of the strut assembly.

DESCRIPTION

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
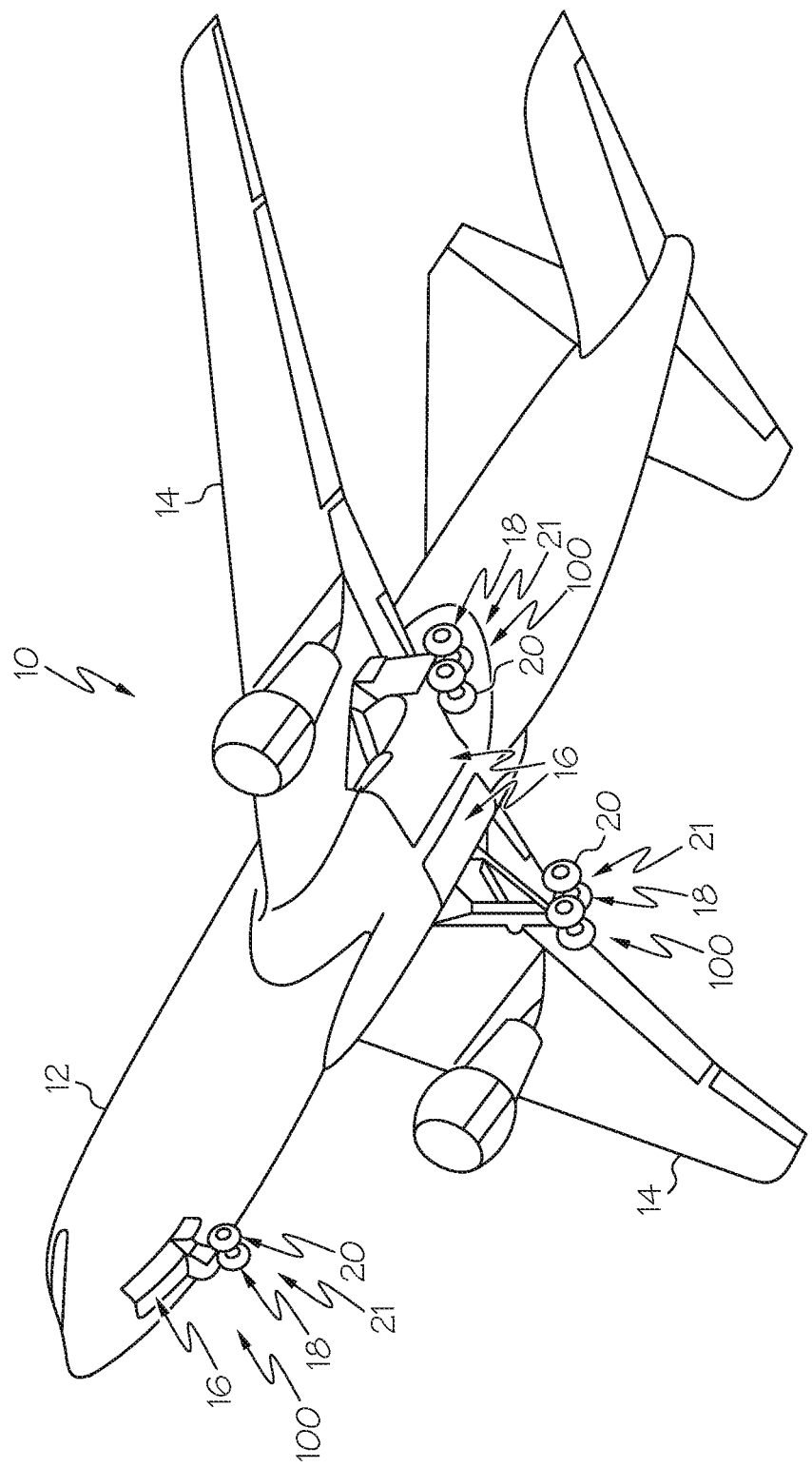
FIG. 1 is a perspective view of an example aircraft.

FIG. 1 is an illustration of an example aircraft 10 that includes strut assemblies 100 according to the present disclosure. Aircraft 10 generally may be utilized to transport persons and/or cargo. As illustrated in FIG. 1, aircraft 10 generally includes a fuselage 12 and a wing assembly 14 operatively coupled to fuselage 12. Fuselage 12 and/or wing assembly 14 define one or more wheel wells 16 (and/or landing gear storage bays and/or wheel storage bays) operatively coupled to and/or configured to receive a corresponding landing gear structure 18. Landing gear structure 18 may include a wheel assembly 20 operatively coupled to fuselage 12 and/or wing assembly 14 via strut assembly 100 and/or a lever assembly 21. In some examples of aircraft 10, the volume of the wheel wells 16 may be minimized so as to maximize the volume available in the fuselage for accommodating passengers, cargo, and structural components, as well as to optimize the aerodynamic properties of the aircraft 10.

Figure 2:
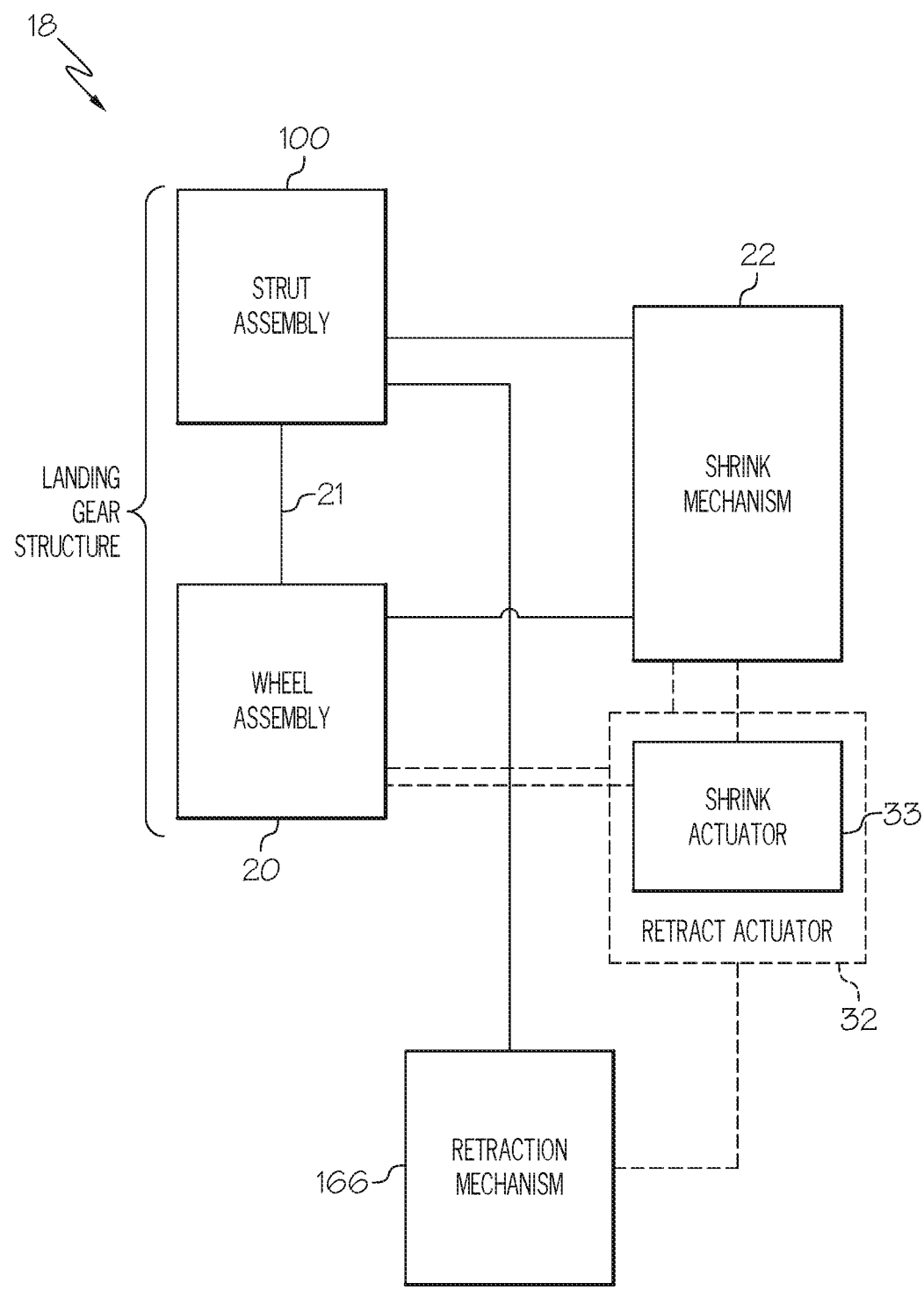
FIG. 2 is a schematic black-box diagram representing examples of aircraft landing gear structures according to the present disclosure.
Figure 3:
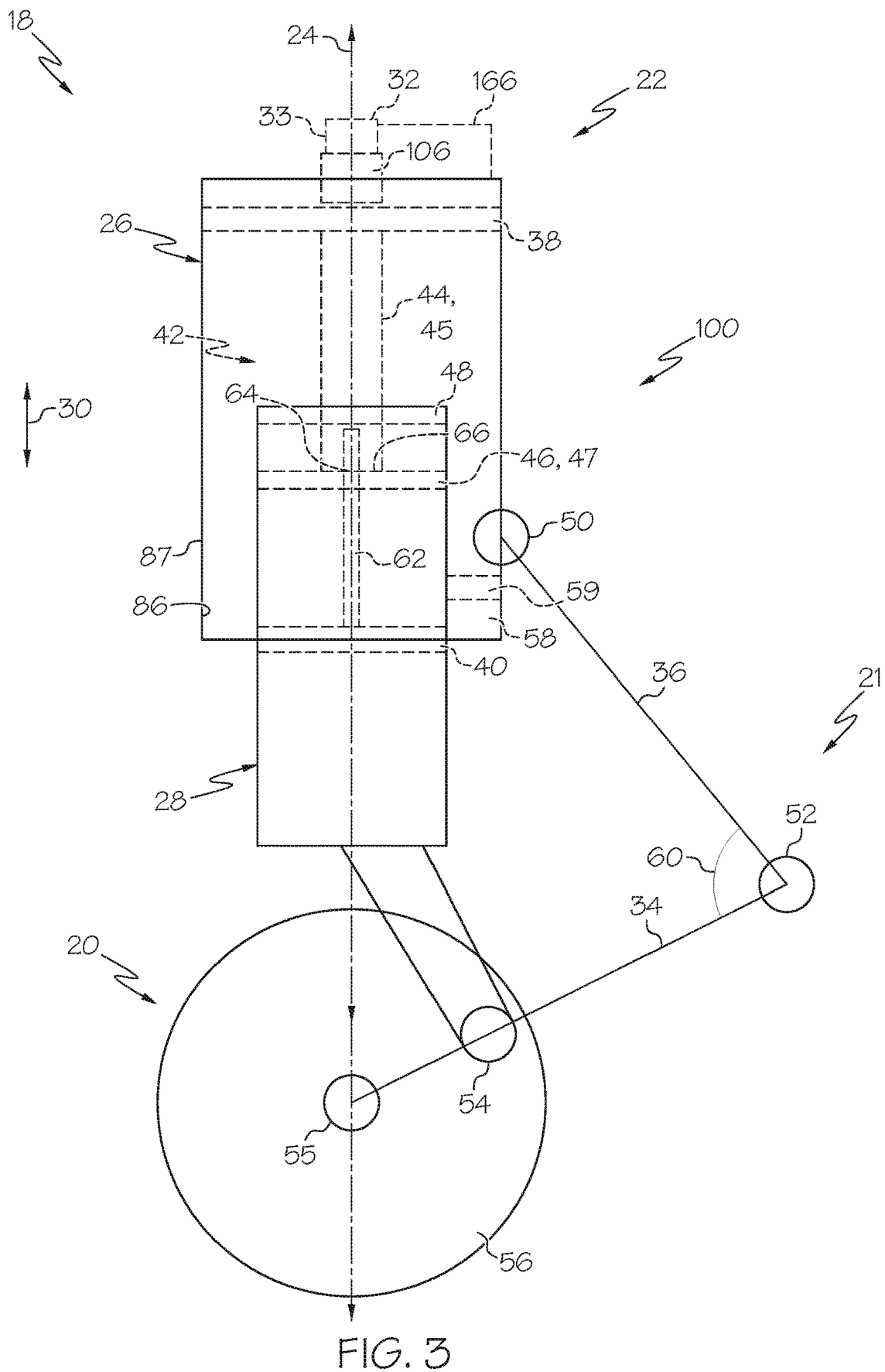
FIG. 3 is a schematic elevation view representing examples of aircraft landing gear structures according to the present disclosure.

FIGS. 2-3 are schematic views of illustrative, non-exclusive examples of strut assemblies 100 and aircraft landing gear structures 18 according to the present disclosure. Strut assemblies 100 may form a portion of landing gear structure 18 (also referred to herein as aircraft landing gear structure 18), which generally also include wheel assembly 20, lever assembly 21, and a shrink mechanism 22. Strut assembly 100 is configured to vary in length (e.g., along a longitudinal axis 24 indicated in FIG. 3) such that strut assembly 100 is configured to transition between a compressed configuration, an extended configuration, and a retracted configuration. In the compressed configuration, strut assembly 100 has a compressed length responsive to a compressive force exerted on strut assembly 100 (e.g., when strut assembly 100 is fully weighted by an aircraft, such as aircraft 10). In the extended configuration, strut assembly 100 has an extended length (e.g., when strut assembly 100 is not weighted by the aircraft). And in the retracted configuration (e.g., for stowage of aircraft landing gear structure 18 within an aircraft wheel well (e.g., wheel well 16)), strut assembly 100 has a retracted length that is less than the extended length, to facilitate stowage of aircraft landing gear structure 18 during flight.

While the compressive force from the weight of the aircraft when the aircraft is on the ground causes strut assembly 100 to transition to the compressed configuration, and removing the compressive force causes strut assembly 100 to transition to the extended configuration, shrink mechanism 22 is configured to transition strut assembly 100 from the extended configuration to the retracted configuration (which may also be referred to as a shrink configuration). The compressed length and the retracted length are less than the extended length, and all are defined along longitudinal axis 24 of strut assembly 100. Because the length of strut assembly 100 is configured to be shortened (or "shrink") after take-off (e.g., when no compressive force from the weight of the aircraft is present), strut assemblies 100 and/or landing gear structures 18 may be configured such that aircraft 10 can accommodate a longer landing gear structure 18 without increasing the size of wheel well 16.

As shown in FIG. 3, strut assembly 100 includes an upper tubular housing 26 and a lower tubular housing 28 operatively coupled to upper tubular housing 26 such that lower tubular housing 28 is configured to be longitudinally translated (e.g., moved along longitudinal axis 24, indicated by arrow 30) relative to upper tubular housing 26. Lower tubular housing 28 is configured to be translated between a compressed position when strut assembly 100 is in the compressed configuration and an extended position when strut assembly 100 is in the extended configuration. Lower tubular housing 28 is further configured to be selectively and longitudinally translated to a retracted position when strut assembly 100 is in the retracted configuration. Upper tubular housing 26 may be coupled to an airframe of the aircraft.

Shrink mechanism 22 is at least partially contained within upper tubular housing 26 and/or lower tubular housing 28 and is configured to selectively and longitudinally translate lower tubular housing 28 with respect to upper tubular housing 26, thereby selectively transitioning strut assembly 100 between the extended configuration and the retracted configuration. In some examples, shrink mechanism 22 is entirely positioned within upper tubular housing 26 and/or lower tubular housing 28, in contrast to prior art mechanisms that are external to the strut assembly. In some examples, shrink mechanism 22 is a mechanical (e.g., physical) link between components of strut assembly 100, as opposed to a hydraulic or pneumatic shrink mechanism. Additionally or alternatively, in some examples, strut assembly 100 is configured such that activation of (also referred to as "actuation of") shrink mechanism 22 by a retract actuator 32 also causes raising and/or tilting of wheel assembly 20 with respect to upper tubular housing 26, via a truck beam 34 and a forward link 36 of lever assembly 21. Additionally or alternatively, in some examples, strut assembly 100 is configured such that actuation of retract actuator 32 is configured to both shrink strut assembly 100 (e.g., shorten the length of strut assembly 100, thereby transitioning strut assembly 100 to the retracted configuration) and also retract strut assembly 100 into a wheel well of the aircraft. Aircraft landing gear structures 18 according to the present disclosure may include just one of these features, may include any combination of two of these features, or may include all three of these features. Each of these concepts will be explained in further detail below.

Turning first to examples of strut assembly 100 with a mechanical shrink mechanism 22, strut assembly 100 may include an upper bulkhead 38 supported by upper tubular housing 26, and configured to be selectively and longitudinally translated with respect to upper tubular housing 26 between a lower position and an upper position. Upper bulkhead 38 is in the lower position when strut assembly 100 is in the compressed configuration and the extended configuration, and upper bulkhead 38 is in the upper position when strut assembly 100 is in the retracted configuration. Strut assembly 100 may also include a lower bulkhead 40 fixed with respect to and supported by lower tubular housing 28, wherein a pressure chamber 42 may be formed between upper bulkhead 38 and lower bulkhead 40, within upper tubular housing 26 and lower tubular housing 28. Shrink mechanism 22 may include upper bulkhead 38. For example, translation of upper bulkhead 38 to the upper position may mechanically cause translation of lower tubular housing 28 to the retracted position, by virtue of a mechanical (e.g., physical) link between upper bulkhead 38 and lower tubular housing 28. In some examples, translation of upper bulkhead 38 to the upper position mechanically causes longitudinal translation of a third tubular member 44 and a third tubular member stop 46 while third tubular member stop 46 is in contact with an inner tube stop 48 fixed within lower tubular housing 28, thereby causing translation of inner tube stop 48 and lower tubular housing 28 with respect to upper tubular housing 26 until lower tubular housing 28 is in the retracted position.

In examples of strut assembly 100 where activation of shrink mechanism 22 also causes raising and/or tilting of wheel assembly 20 with respect to upper tubular housing 26, wheel assembly 20 is operatively coupled to strut assembly 100 via lever assembly 21 (e.g., truck beam 34 and forward link 36). For example, forward link 36 is pivotally coupled to upper tubular housing 26 via a first link pivot joint 50, in some examples. Forward link 36 also includes a second link pivot joint 52 to pivotally couple forward link 36 to truck beam 34. Truck beam 34 is further pivotally coupled to lower tubular housing 28 in these examples, such as by a middle pivot joint 54, and truck beam 34 is pivotally coupled with respect to a wheel hub 56 of wheel assembly 20. For example, truck beam 34 may be pivotally coupled to wheel hub 56, to an axle 55 of wheel assembly 20, and/or to any other component of wheel assembly 20. Wheel assembly 20 may thus be operatively coupled to upper tubular housing 26 and/or lower tubular housing 28 of strut assembly 100 via forward link 36 (e.g., via first link pivot joint 50 coupling forward link 36 to upper tubular housing 26) and truck beam 34 (e.g., via middle pivot joint 54 coupling truck beam 34 to lower tubular housing 28). As used herein, two components are said to be 'pivotally coupled' to one another when those components are movably coupled with respect to one another, such that the components are pivotable with respect to one another and also coupled together.

In this manner, truck beam 34 may be coupled with respect to strut assembly 100 such that longitudinal translation of lower tubular housing 28 with respect to upper tubular housing 26 causes pivoting of forward link 36 and truck beam 34 with respect to one another. In other words, in some aircraft landing gear structures 18 according to the present disclosure, when strut assembly 100 is transitioned to the retracted configuration (e.g., shrunk) and lower tubular housing 28 is translated longitudinally with respect to upper tubular housing 26, at least a portion of truck beam 34 is also longitudinally translated with respect to upper tubular housing 26 by virtue of being coupled to lower tubular housing 28. This translation of truck beam 34 and lower tubular housing 28 with respect to upper tubular housing 26 thus causes pivoting of truck beam 34 with respect to forward link 36 such that a pivot angle 60 between the two changes as strut assembly 100 is transitioned between configurations. In some examples, such pivoting of truck beam 34 with respect to forward link 36 causes raising and/or tilting of wheel assembly 20, thereby reducing the overall length of aircraft landing gear structure 18 for stowage during flight (e.g., retraction).

In examples of strut assembly 100 where retract actuator 32 both shrinks strut assembly 100 (e.g., transitions strut assembly 100 from the expanded configuration to the retracted configuration, shortening the overall length of strut assembly 100) and retracts strut assembly 100 into the aircraft for stowage during flight (e.g., rotates strut assembly 100 into wheel wells of the aircraft for flight), retract actuator 32 may be mechanically linked (which may also be referred to as physically linked, or "slaved") to shrink mechanism 22, such that actuation of retract actuator 32 to retract strut assembly 100 also causes activation of shrink mechanism 22 to transition strut assembly 100 to the retracted configuration. In other examples, strut assembly 100 may include retract actuator 32 to retract aircraft landing gear structure 18 into the aircraft, and a separate shrink actuator 33 configured to activate shrink mechanism 22 and shrink strut assembly 100. Some examples include a retraction mechanism 166 that acts in conjunction with retract actuator 32 to retract aircraft landing gear structure 18.

In some examples, shrink mechanism 22 is positioned at least partially within upper tubular housing 26 and/or lower tubular housing 28, such that it is at least partially shielded from the environment outside strut assembly 100. As compared to prior landing gear structures with external mechanisms for shrinking the strut assembly and/or raising the wheels, presently disclosed aircraft landing gear structures 18 may be simpler and/or more resistant to fatigue, damage, and/or wear. Shrink mechanism 22 includes a locking link assembly 106 in some examples.

In some examples, strut assembly 100 has an extended pressure within pressure chamber 42 when strut assembly 100 is in the extended configuration and in the retracted configuration, and a compressed pressure within pressure chamber 42 when strut assembly 100 is in the compressed configuration. The compressed pressure is greater than the extended pressure, such as due to compression of a strut gas within pressure chamber 42. In some examples, a retracted pressure within pressure chamber 42 when strut assembly 100 is in the retracted configuration is substantially equal to the extended pressure (e.g., there is substantially no compression of strut fluids or gases within pressure chamber 42 when strut assembly 100 is transitioned to the retracted configuration). Furthermore, in these examples, pressure chamber 42 has a first internal volume when strut assembly 100 is in the extended configuration and in the retracted configuration, and a second internal volume when strut assembly 100 is in the compressed configuration, wherein the first internal volume is greater than the second internal volume.

In some examples, strut assembly 100 also includes a metering pin 62 coupled to or integrally formed with lower bulkhead 40 such that it extends longitudinally from lower bulkhead 40 towards upper bulkhead 38, and such that it is configured to be received through an orifice 64 formed in an orifice plate 66 of an orifice support tube 45 (which is an example of third tubular member 44). Metering pin 62 is configured to be translated longitudinally through and with respect to orifice 64, as strut assembly 100 is transitioned between the extended configuration and the compressed configuration. In examples where strut assembly 100 is an oleo strut assembly (which may also be referred to as a gas-oil strut assembly), pressure chamber 42 contains a strut fluid (e.g., a strut oil) and/or a strut gas between upper bulkhead 38 and lower bulkhead 40, such that metering pin 62 meters or controls the flow of the strut fluid through orifice 64 as strut assembly 100 transitions between configurations. In these examples, orifice plate 66 and metering pin 62 are positioned within pressure chamber 42.

While FIG. 3 and examples described herein illustrate upper tubular housing 26 as an outer tubular housing, and lower tubular housing 28 as an inner tubular housing (e.g., lower tubular housing 28 is longitudinally translated within, or adjacent an inner surface 86 of, upper tubular housing 26), it is also within the scope of the present disclosure for the housings to be arranged in the reverse, such that lower tubular housing 28 is the outer tubular housing, and upper tubular housing 26 is the inner tubular housing, such that lower tubular housing 28 would longitudinally translate outside of, or adjacent an outer wall 87 of, upper tubular housing 26.

In some examples, strut assembly 100 includes a recoil chamber 58 and a recoil valve 59 positioned between pressure chamber 42 and recoil chamber 58. For example, one or more recoil chambers 58 may be defined between upper tubular housing 26 and lower tubular housing 28. Recoil valve 59 may be configured to regulate flow of a strut liquid between pressure chamber 42 and recoil chamber 58 when strut assembly 100 transitions between the compressed configuration and the extended configuration. Additionally or alternatively, recoil valve 59 may be configured to selectively prevent flow of a strut liquid between pressure chamber 42 and recoil chamber 58 when strut assembly 100 transitions between the retracted configuration and the extended configuration.

Turning now to FIGS. 4-11, illustrative non-exclusive examples of aircraft landing gear structures 18 are illustrated. Where appropriate, the reference numerals from the schematic illustrations of FIGS. 2-3 are used to designate corresponding parts in FIGS. 4-11; however, the examples of FIGS. 4-11 are non-exclusive and do not limit aircraft landing gear structures 18 to the illustrated embodiments. That is, aircraft landing gear structures 18 are not limited to the specific embodiments of the illustrated FIGS. 4-11 and may incorporate any number of the various aspects, configurations, characteristics, properties, etc. of aircraft landing gear structures 18 that are illustrated in and discussed with reference to the schematic representations of FIGS. 2-3 and/or the embodiments of FIGS. 4-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each embodiment or schematic illustration, however, it is within the scope of the present disclosure that the previously discussed features, variants, etc. may be utilized with other embodiments.

Figure 4:
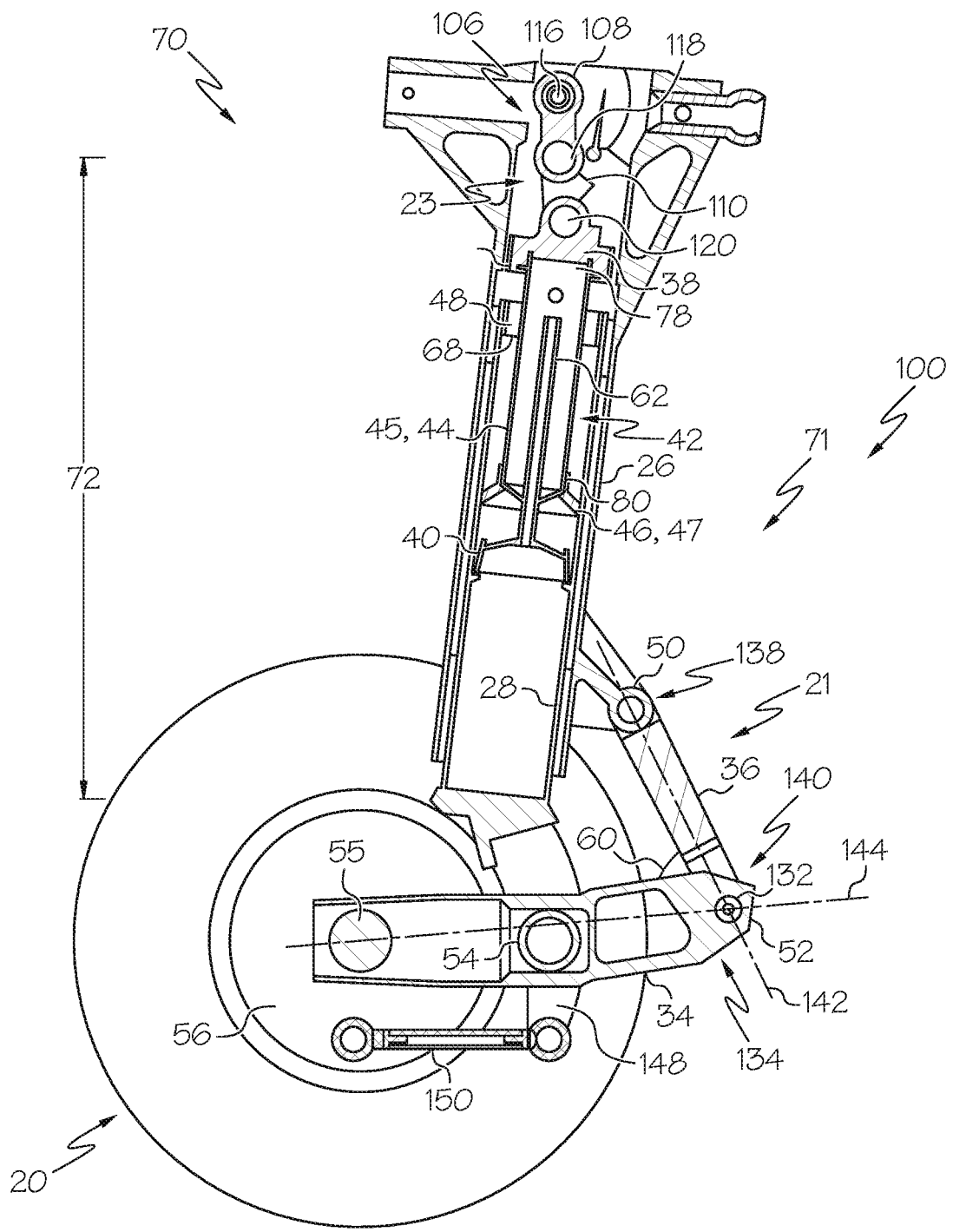
FIG. 4 is an elevation, partial cut-away view of an example of an aircraft landing gear structure according to the present disclosure, in a compressed configuration.
Figure 5:
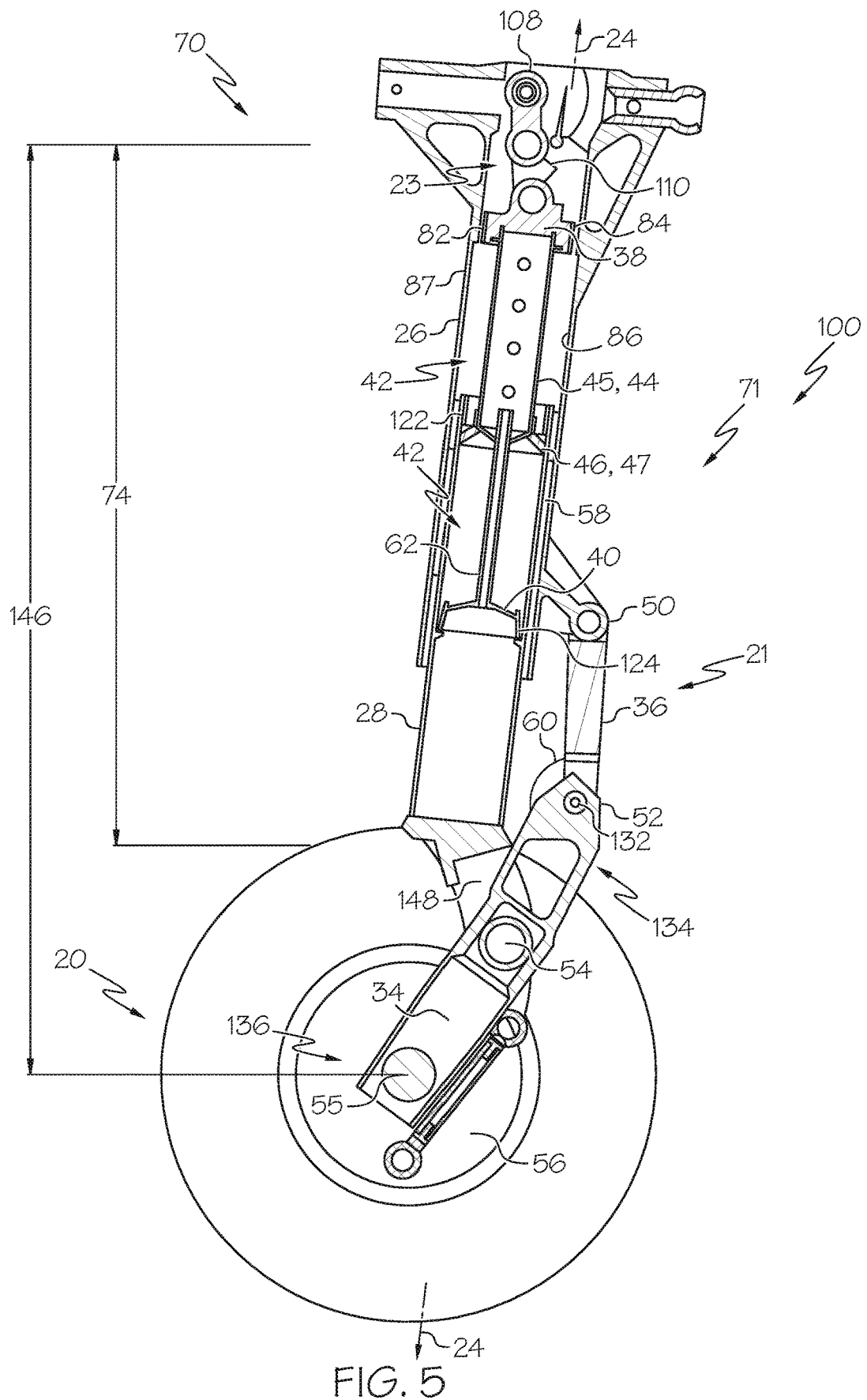
FIG. 5 is an elevation, partial cut-away view of the aircraft landing gear structure of FIG. 4, in an extended configuration.
Figure 6:
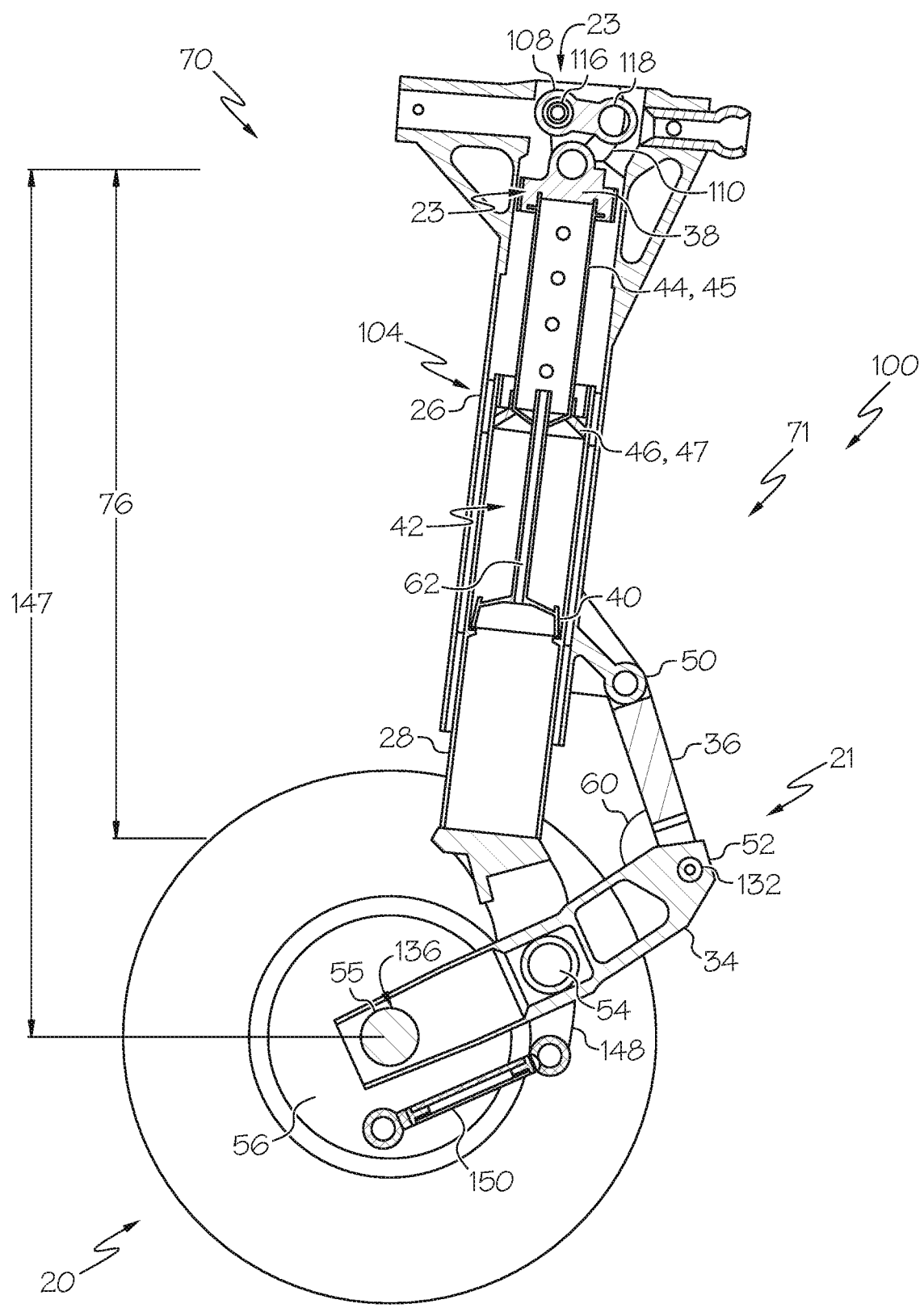
FIG. 6 is an elevation, partial cut-away view of the aircraft landing gear structure of FIG. 4, in a retracted configuration.

FIGS. 4-6 illustrate aircraft landing gear structure 70 (which is an example of aircraft landing gear structure 18) in the compressed configuration (FIG. 4), extended configuration (FIG. 5), and retracted configuration (FIG. 6). Aircraft landing gear structure 70 includes a mechanical (rather than pneumatic or hydraulic) shrink mechanism 23 (which is an example of shrink mechanism 22) that is configured to transition (e.g., shrink) strut assembly 71 (which is an example of strut assembly 100) from the extended configuration to the retracted configuration. Again, aircraft landing gear structure 70 is in the compressed configuration of FIG. 4 when weighted by the aircraft (e.g., when the aircraft is on the ground), and in the extended configuration of FIG. 5 when the weight is removed (e.g., when the aircraft is in the air). In the compressed configuration, which may be a statically compressed configuration, a majority of lower tubular housing 28 is positioned within upper tubular housing 26, with a majority of metering pin 62 positioned within orifice support tube 45, and a majority of orifice support tube 45 positioned within lower tubular housing 28. In the extended configuration, lower tubular housing 28 is longitudinally translated such that it is partially outside of (e.g., below and not contained within) upper tubular housing 26, a majority of metering pin 62 is outside of (e.g., below, and not contained within) orifice support tube 45, and a majority of orifice support tube 45 is not contained within lower tubular housing 28.

Strut assembly 71 or aircraft landing gear structure 70 includes upper bulkhead 38 supported by upper tubular housing 26, and configured to be selectively and longitudinally translated with respect to upper tubular housing 26 between a lower position (FIGS. 4 and 5) and an upper position (FIG. 6). Upper bulkhead 38 is in the lower position when strut assembly 71 is in the compressed configuration and the extended configuration, and upper bulkhead 38 is in the upper position when strut assembly 71 is in the retracted configuration. Translation of upper bulkhead 38 to the upper position mechanically causes translation of lower tubular housing 28 to the retracted position, by virtue of a mechanical (e.g., physical) link between upper bulkhead 38 and lower tubular housing 28. In this manner, shrink mechanism 23 includes upper bulkhead 38.

Figure 7:
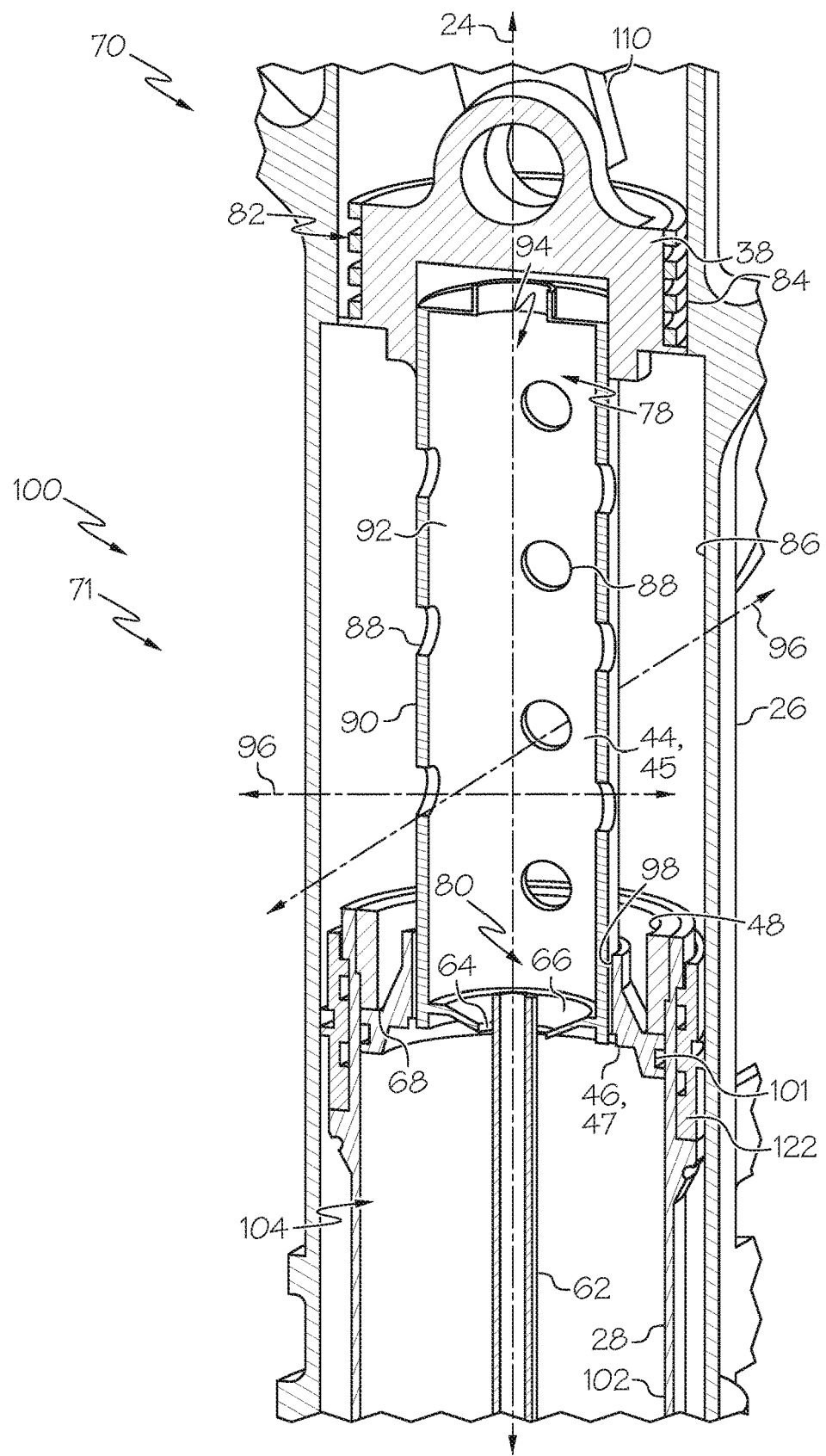
FIG. 7 is a close-up, perspective, partial cut-away view of a portion of an example of an aircraft landing gear structure according to the present disclosure, in an extended configuration.

More specifically, translation of upper bulkhead 38 to the upper position mechanically causes longitudinal translation of orifice support tube 45 (or other third tubular member 44) and an orifice plate flange 47 (which is an example of third tubular member stop 46) while orifice plate flange 47 contacts and causes longitudinal translation of inner tube stop 48 fixed within lower tubular housing 28. Pulling up on inner tube stop 48 by orifice plate flange 47 (or other third tubular member stop 46) thereby causes translation of lower tubular housing 28 with respect to upper tubular housing 26 until lower tubular housing 28 is in the retracted position shown in FIG. 6. FIG. 7 illustrates a close-up view of a portion of aircraft landing gear structure 70 in the extended position of FIG. 5, more clearly illustrating upper bulkhead 38 in the lower position, with orifice plate flange 47 in contact with inner tube stop 48 of lower tubular housing 28. When upper bulkhead 38 is moved to the upper position of FIG. 6, such translation of upper bulkhead 38 with respect to upper tubular housing 26 causes corresponding translation of orifice support tube 45 and orifice plate flange 47 (because both are fixed to upper bulkhead 38) with respect to upper tubular housing 26. Because of the positioning of orifice plate flange 47 below inner tube stop 48, and because inner tube stop 48 is fixed with respect to lower tubular housing 28, when orifice plate flange 47 is translated upwards (e.g., in the direction of upper bulkhead 38), it pulls up on an underside 68 of inner tube stop 48, thereby pulling up on lower tubular housing 28 and causing longitudinal translation of lower tubular housing 28 with respect to upper tubular housing 26. Such longitudinal translation of lower tubular housing 28 moves it further inside upper tubular housing 26 (though in other examples, the arrangement may be reversed such that upper tubular housing 26 is partially within lower tubular housing 28, rather than vice versa, as shown), thereby reducing the overall height of strut assembly 71 (e.g., shrinking strut assembly 71), and transitioning strut assembly 71 to the retracted configuration shown in FIG. 6. Inner tube stop 48 may also be configured to limit longitudinal translation of lower tubular housing 28 with respect to upper tubular housing 26, such as by preventing complete separation of upper tubular housing 26 from lower tubular housing 28 as strut assembly 71 extends to the extended configuration.

In the compressed configuration of FIG. 4 strut assembly 71 has a compressed length 72, in the extended configuration of FIG. 5 strut assembly 71 has an extended length 74, and in the retracted configuration of FIG. 6 strut assembly 71 has a retracted length 76. Compressed length 72 and retracted length 76 are less than extended length 74. In some examples, compressed length 72 is less than retracted length 76, though in other examples, compressed length 72 and retracted length 76 may be approximately equal to one another, or retracted length 76 may even be less than compressed length 72. In some examples, extended length 74 is 1.1-1.5 times greater than retracted length 76. Additionally or alternatively, a difference between extended length 74 and retracted length 76 may be in a range of 0-5 inches, 5-10 inches, 5-15 inches, 10-25 inches, 10-20 inches, 10-15 inches, 15-25 inches, 15-20 inches, and/or 20-25 inches.

In this example, strut assembly 71 also includes lower bulkhead 40 fixed with respect to and supported by lower tubular housing 28, such that a pressure chamber 42 is formed between upper bulkhead 38 and lower bulkhead 40, and within upper tubular housing 26 and lower tubular housing 28. Pressure chamber 42 generally contains a strut fluid and/or strut gas, such as in examples where strut assembly 71 is an oleo strut assembly. For example, upper bulkhead 38 forms a gas seal 82 within upper tubular housing 26, thereby substantially preventing the strut fluid and/or strut gas from exiting pressure chamber 42 at upper bulkhead 38. Gas seal 82 may be a dynamic gas seal (e.g., is moveable, as upper bulkhead 38 moves between the upper position and the lower position) formed between an outer surface 84 of upper bulkhead 38 and inner surface 86 of upper tubular housing 26.

Orifice plate 66 (best seen in FIG. 7) and metering pin 62 are positioned within pressure chamber 42 such that as strut assembly 71 is transitioned between the compressed configuration and the extended configuration, strut fluid may pass through orifice 64 of orifice plate 66, with metering pin 62 limiting the speed at which the fluid flows through orifice 64. In some examples, a mass of strut gas within pressure chamber 42 has a compressed pressure when strut assembly 71 is in the compressed configuration, an extended pressure when strut assembly 71 is in the extended configuration, and a retracted pressure when strut assembly 71 is in the retracted configuration. Generally, the compressed pressure is greater than the extended pressure and the retracted pressure. Strut assembly 71 is configured to transition between the compressed configuration, the extended configuration, and the retracted configuration without the use of sensors or feedback data, in some examples.

Third tubular member 44 (e.g., orifice support tube 45) extends longitudinally from a first end region 78 to a second end region 80, with third tubular member 44 being coupled to upper bulkhead 38 within first end region 78, such that third tubular member 44 is fixed with respect to upper bulkhead 38. Third tubular member 44 is substantially cylindrical in some examples, though other shapes are also within the scope of the present disclosure. As best seen in FIG. 7, third tubular member 44 may include a plurality of bores 88 formed therethrough, from an outer support tube wall 90 to an inner support tube wall 92. Inner support tube wall 92 defines an interior volume 94 of third tubular member 44, through which strut fluid and/or strut gas may flow as it passes through bores 88 and orifice 64 as strut assembly 71 is transitioned between configurations. Bores 88 may be formed through the wall of third tubular member 44 such that each respective bore has a respective bore axis 96 that is orthogonal to longitudinal axis 24 in some examples. The plane of orifice 64 intersects longitudinal axis 24 in some examples. Third tubular member 44 is generally substantially rigid, such that orifice plate 66 and third tubular member stop 46 (e.g., orifice plate flange 47) are fixed with respect to first end region 78 of third tubular member 44, and therefore with respect to upper bulkhead 38 (though third tubular member stop 46 may be positioned and/or fixed within second end region 80 of third tubular member 44). Orifice plate 66 and third tubular member stop 46 are generally fixed with respect to one another, such that third tubular member 44, orifice plate 66, and third tubular member stop 46 move together as a unit when upper bulkhead 38 moves between the upper position and the lower position, thereby causing translation of third tubular member 44 with respect to upper tubular housing 26.

Third tubular member 44, orifice plate 66, and third tubular member stop 46 may be integrally formed with one another in some examples, or may be individual components coupled together. For example, and as best seen in FIG. 7, an inner surface 98 of orifice plate flange 47 may be coupled to outer support tube wall 90. An outer surface 101 of orifice plate flange 47 may engage lower tubular housing 28 (e.g., an inner wall 102 of lower tubular housing 28). Inner tube stop 48 is coupled to inner wall 102 of lower tubular housing 28 in this example, in an upper end region 104 of lower tubular housing 28, such that orifice plate flange 47 and inner tube stop 48 are engaged with one another when lower tubular housing 28 is maximally extended with respect to upper tubular housing 26 (e.g., in the extended configuration of FIG. 5).

Second end region 80 of third tubular member 44 is positioned within lower tubular housing 28 in the example of FIGS. 4-7, with lower tubular housing 28 being longitudinally translated with respect to third tubular member 44 as strut assembly 71 transitions between the compressed configuration (FIG. 4) and the extended configuration (FIG. 5). In the compressed configuration of FIG. 4, the majority of third tubular member 44 is positioned within lower tubular housing 28, whereas, in the extended configuration of FIG. 5, the majority of third tubular member 44 is positioned outside of (e.g., above) lower tubular housing 28 and within upper tubular housing 26, though second end region 80 remains within lower tubular housing 28 even in the extended configuration.

In some examples, and as shown in FIGS. 4-6, shrink mechanism 23 may include locking link assembly 106. Locking link assembly 106 includes an upper link 108 and a lower link 110 pivotally coupled to one another, in some examples. Lower link 110 is pivotally coupled to upper bulkhead 38 in the example shown in FIGS. 4-6. Locking link assembly 106 is configured to transition between a lengthened configuration and a shortened configuration. Locking link assembly 106 is in the lengthened configuration when strut assembly 71 is in the compressed configuration (FIG. 4) and the extended configuration (FIG. 5), and locking link assembly 106 is in the shortened configuration when strut assembly 71 is in the retracted configuration (FIG. 6).

Locking link assembly 106 may be a bistable mechanism, such that it has two stable positions of upper link 108 and lower link 110 relative to one another. For example, in the lengthened configuration (FIGS. 4-5), upper link 108 and lower link 110 may be held over-center, as shown. In the shortened configuration (FIG. 6), upper link 108 and lower link 110 are not held over-center, but instead are pivoted with respect to one another such that the overall length of locking link assembly 106 is reduced in the shortened configuration as compared to the lengthened configuration. Additionally, transitioning locking link assembly 106 to the shortened configuration longitudinally translates (e.g., raises) lower link 110 with respect to upper tubular housing 26. In the lengthened configuration, locking link assembly 106 is configured to withstand forces from the weight of the aircraft that are transferred to locking link assembly 106 via lower tubular housing 28, lower bulkhead 40, and upper bulkhead 38, such that locking link assembly 106 remains in the lengthened configuration when strut assembly 71 is in the compressed configuration (FIG. 4). Put another way, when strut assembly 71 is in the compressed configuration and locking link assembly 106 is in the lengthened configuration, locking link assembly 106 may be configured to prevent longitudinal translation of upper bulkhead 38 away from lower bulkhead 40, such that upper bulkhead 38 is substantially fixed in place with respect to upper tubular housing 26 and lower bulkhead 40 when strut assembly 71 is in the compressed configuration of FIG. 4.

Because locking link assembly 106 is coupled to upper bulkhead 38 via lower link 110 in this example, transitioning locking link assembly 106 to the shortened configuration (FIG. 6) causes longitudinal translation of upper bulkhead 38 with respect to upper tubular housing 26 such that upper bulkhead 38 is moved to its upper position as lower link 110 is longitudinally translated (e.g., raised) with respect to upper tubular housing 26. In one example, transitioning locking link assembly 106 to the shortened configuration results in longitudinal translation of lower link 110 by a first distance, as well as a corresponding longitudinal translation of lower tubular housing 28 by a second distance. First distance and second distance may be substantially equal to one another in some examples.

Figure 9:
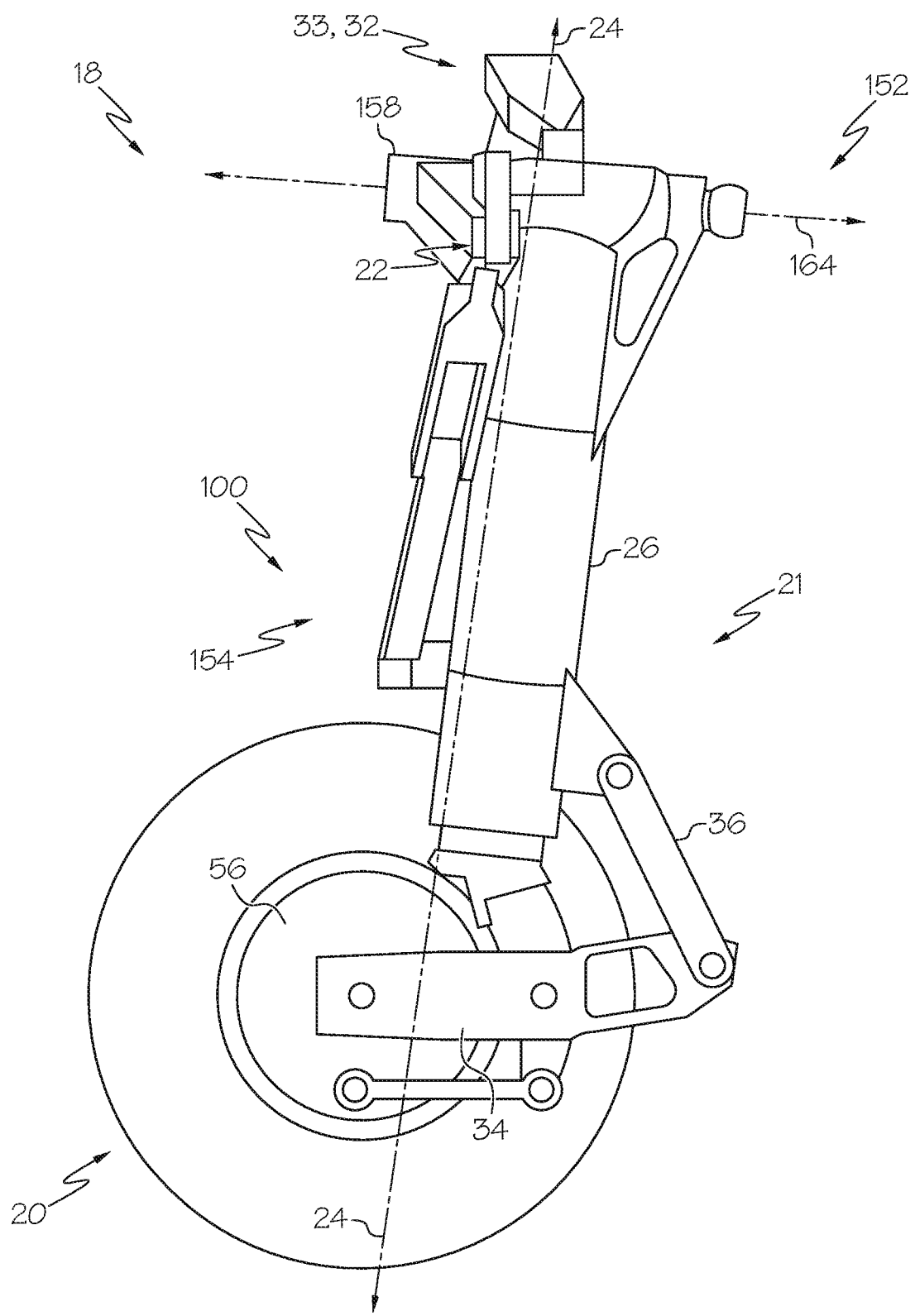
FIG. 9 is an elevation view of an example of an aircraft landing gear structure according to the present disclosure.
Figure 10:
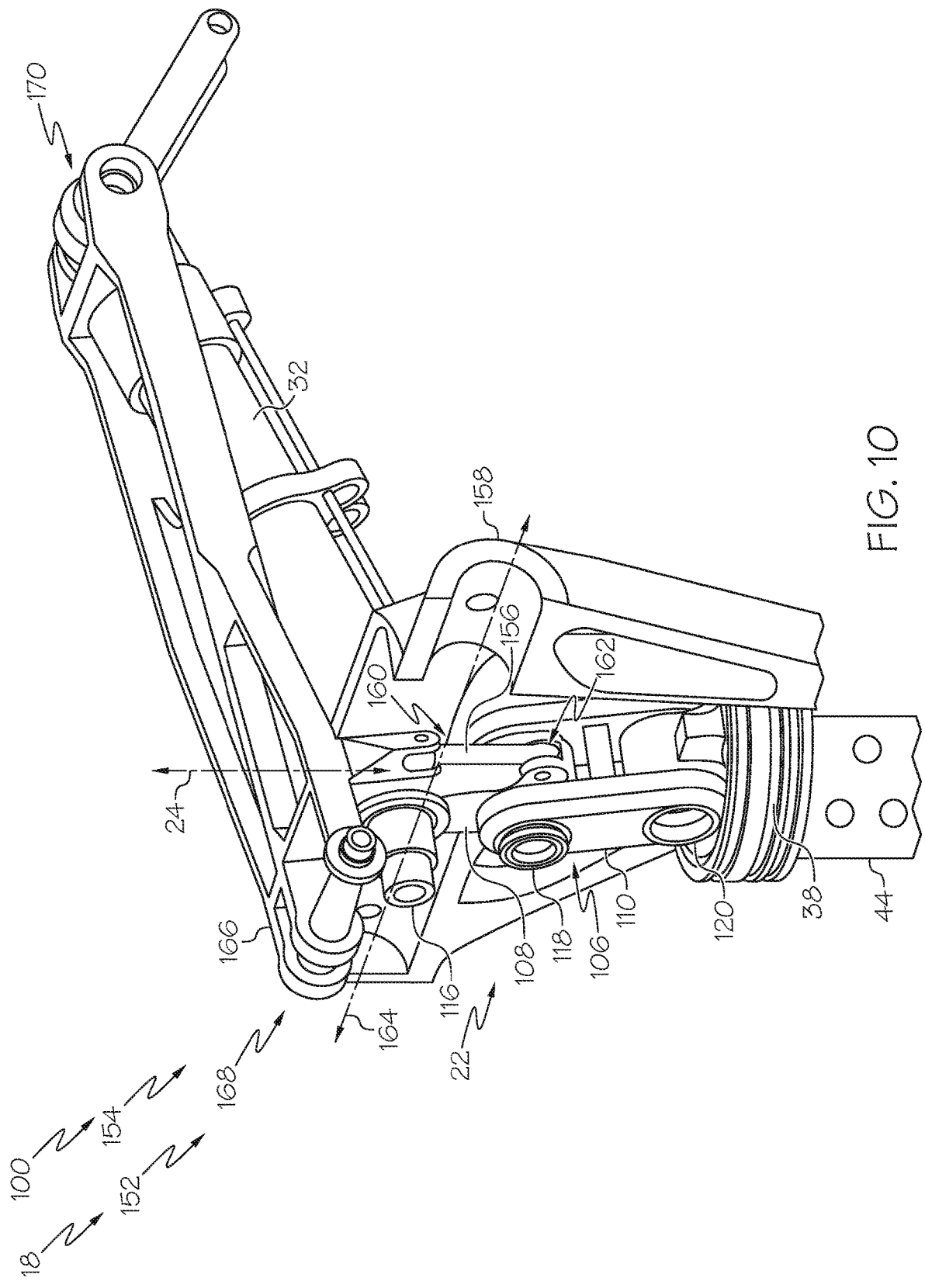
FIG. 10 is a perspective view of an example of a retract actuator for an aircraft landing gear structure according to the present disclosure, in a ground configuration.
Figure 11:
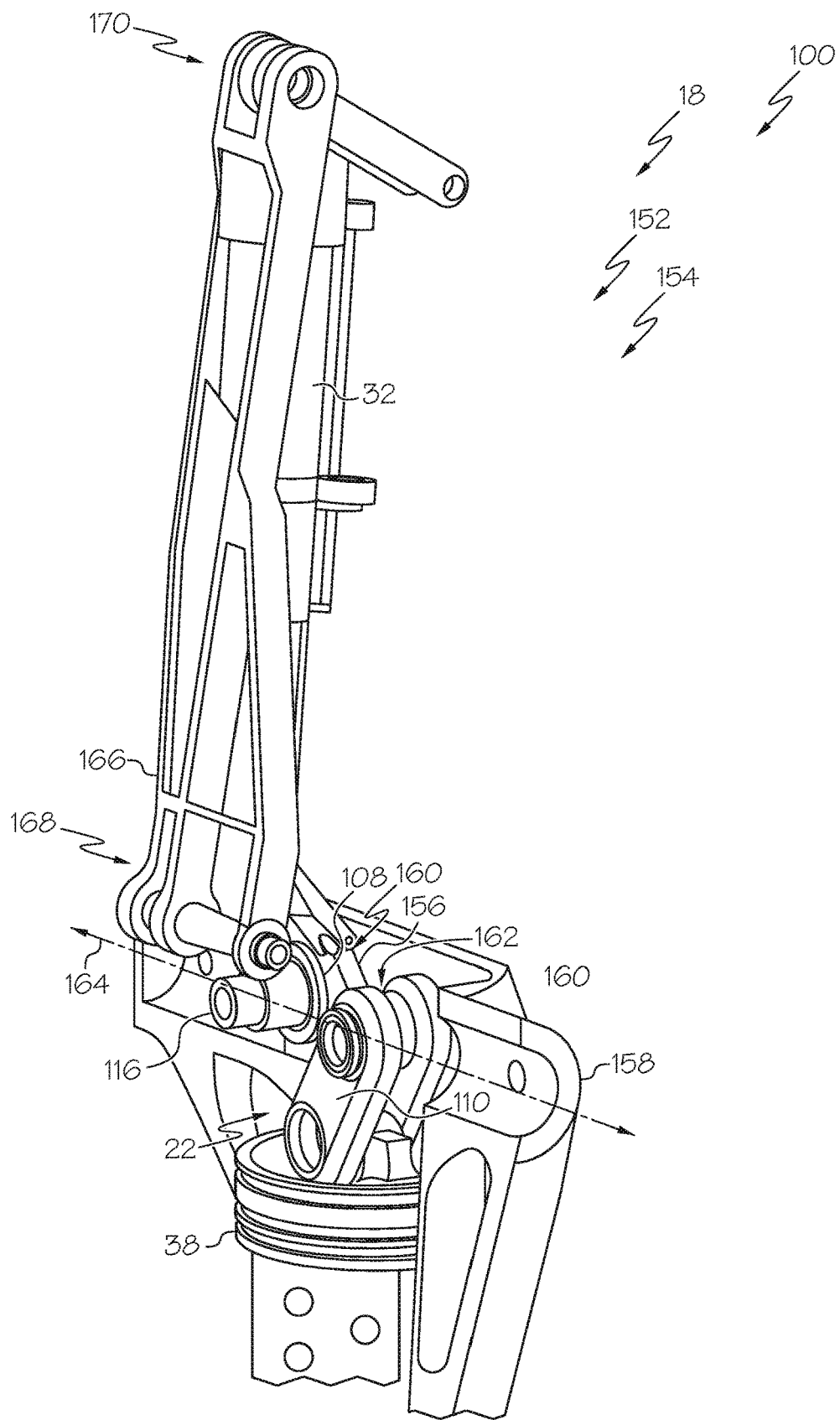
FIG. 11 is a perspective view of the retract actuator of FIG. 10, in a stowed configuration.

Shrink mechanism 23 may be actuated, or engaged, by a retract actuator (e.g., retract actuator 32), examples of which are illustrated in FIGS. 9-11, or by a separate shrink actuator 33 (FIG. 2). For example, and as best seen in FIGS. 10-11, upper link 108 of locking link assembly 106 may be coupled to retract actuator 32 (or shrink actuator 33) such that selectively actuating retract actuator 32 (or shrink actuator 33) transitions locking link assembly 106 between the lengthened configuration and the shortened configuration (thereby selectively shrinking strut assembly 71 via shrink mechanism 23). In other examples, lower link 110 of locking link assembly 106 may be coupled to retract actuator 32 (or shrink actuator 33) such that selectively actuating retract actuator 32 (or shrink actuator 33) transitions locking link assembly 106 between the lengthened configuration and the shortened configuration.

Upper link 108 is pivotally coupled to a fixed structure of the aircraft, in some examples, such as via an upper pin 116. An apex pin 118 pivotally couples upper link 108 to lower link 110, and a lower pin 120 pivotally couples lower link 110 to strut assembly 71 (e.g., to upper bulkhead 38) in some examples. In other examples, upper link 108 and lower link 110 may be coupled via other mechanisms, and/or locking link assembly 106 may be coupled to upper bulkhead 38 via other mechanisms.

Additionally or alternatively, locking link assembly 106 may include additional links, connections, and/or components.

Some strut assemblies 100 (e.g., strut assembly 71) may include bearings between upper tubular housing 26 and lower tubular housing 28, such as upper bearings 122 (best seen in FIG. 7) and lower bearings 124 (best seen in FIG. 5). Upper bearings 122 and lower bearings 124 may radially separate upper tubular housing 26 from lower tubular housing 28, as well as facilitate longitudinal translations of lower tubular housing 28 with respect to upper tubular housing 26 (e.g., when strut assembly 100 transitions between the extended configuration and the compressed configuration, or between the extended configuration and the retracted configuration). In some examples, upper bearings 122 and lower bearings 124 are longitudinally spaced apart, such that recoil chamber 58 is defined there between.

Figure 8:
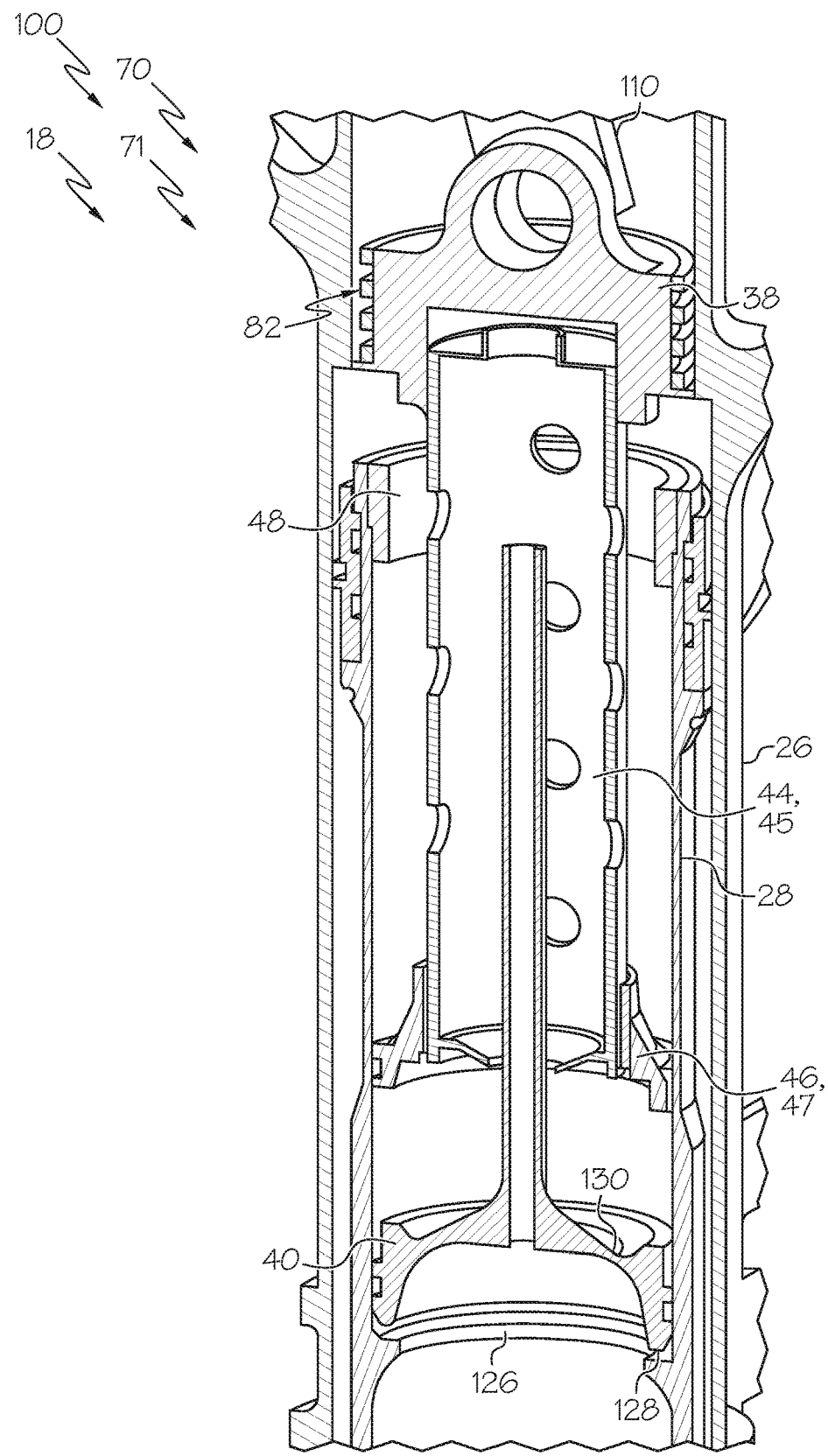
FIG. 8 is a close-up, perspective, partial cut-away view of a portion of an example of an aircraft landing gear structure according to the present disclosure, in a compressed configuration.

As best seen in FIG. 8, which is a partial close-up of strut assembly 71 in the compressed configuration as seen in FIG. 4, strut assembly 71 may include a shelf 126 for positioning and restricting longitudinal movement of lower bulkhead 40 with respect to lower tubular housing 28. For example, shelf 126 may be configured to engage an underside portion 128 of lower bulkhead 40, where underside portion 128 is opposite an upper portion 130 of lower bulkhead 40 that faces upper bulkhead 38. In this manner, lower bulkhead 40 may be substantially fixed with respect to lower tubular housing 28, whether strut assembly 71 is in the extended configuration, the compressed configuration, or the retracted configuration.

Returning to FIGS. 4-6, presently disclosed aircraft landing gear structures 18 may include a respective lever assembly 21 operatively coupled to strut assembly 100, and further operatively coupled to wheel assembly 20, such as via axle 55. Lower tubular housing 28 is directly coupled to wheel assembly 20 and/or to lever assembly 21 in some examples. In other examples, lower tubular housing 28 is operatively coupled to wheel assembly 20 and/or to lever assembly 21 via one or more intermediate members (e.g., truck beam 34).

In the example of aircraft landing gear structure 70, forward link 36 is pivotally coupled to upper tubular housing 26 via first link pivot joint 50, and pivotally coupled to truck beam 34 via second link pivot joint 52. Truck beam 34 is further coupled to lower tubular housing 28 and coupled with respect to wheel hub 56 (e.g., truck beam 34 may be coupled to wheel hub 56, to axle 55 of wheel assembly 20, and/or to another component of wheel assembly 20). In this manner, truck beam 34 is coupled with respect to strut assembly 71 such that longitudinal translation of lower tubular housing 28 with respect to upper tubular housing 26 causes pivoting of forward link 36 and truck beam 34 with respect to one another. For example, forward link 36 and truck beam 34 are arranged differently with respect to one another when strut assembly 71 is in the compressed configuration (FIG. 4) than when strut assembly 71 is in the extended configuration (FIG. 5) or retracted configuration (FIG. 6). For example, as shown, pivot angle 60 is acute when strut assembly 71 is in the compressed configuration, and obtuse when strut assembly 71 is in the extended configuration. This is not meant to be limiting as to the arrangement between truck beam 34 and forward link 36 (e.g., all examples of strut assembly 100 or aircraft landing gear structure 18 need not have this arrangement), but rather is meant to describe an example of forward link 36 and truck beam 34 pivoting with respect to one another as strut assembly 71 transitions between configurations.

Shrink mechanism 23 (which may including locking link assembly 106 and upper bulkhead 38 mechanically coupled to lower tubular housing 28, as described above, or may be a different mechanism) is configured to selectively and longitudinally translate lower tubular housing 28 with respect to upper tubular housing 26, which, in this example, causes pivoting of forward link 36 with respect to truck beam 34. In other words, in this example, shrinking strut assembly 71 (e.g., longitudinally moving lower tubular housing 28 with respect to upper tubular housing 26 to the retracted configuration of FIG. 6) also causes lever assembly 21 to raise and/or tilt wheel hub 56.

In this example, middle pivot joint 54 (which pivotally couples truck beam 34 to lower tubular housing 28) is longitudinally translated with respect to upper tubular housing 26 when lower tubular housing 28 is longitudinally translated with respect to upper tubular housing 26. Truck beam 34 is pivotally coupled to second link pivot joint 52 of forward link 36, such as via a truck pivot point 132, which may be positioned within a forward end region 134 of truck beam 34. Truck beam 34 is pivotally coupled with respect to wheel hub 56 within an aft end region 136 in some examples, where aft end region 136 is opposite forward end region 134. Middle pivot joint 54 is positioned between aft end region 136 and forward end region 134 of truck beam 34 in this example. Similarly, first link pivot joint 50 may be positioned within a first end region 138 of forward link 36 and second link pivot joint 52 may be positioned within a second end region 140 of forward link 36, though other arrangements are also within the scope of the present disclosure.

For purposes of describing the relative motion of forward link 36 and truck beam 34, pivot angle 60 may be defined at the intersection of a first line 142 and a second line 144 (illustrated in FIG. 4), with the vertex of pivot angle 60 opening towards lower tubular housing 28, as indicated in the figures. First line 142 intersects the center points of first link pivot joint 50 and second link pivot joint 52, and second line 144 intersects the center points of truck pivot point 132 and axle 55. Lever assembly 21 is configured such that longitudinal translation of lower tubular housing 28 with respect to upper tubular housing 26 causes pivot angle 60 to change (e.g., increase or decrease, depending on whether strut assembly 71 is being shortened or lengthened). When pivot angle 60 is reduced (e.g., when strut assembly 71 is shortened, such as via shrink mechanism 23 or other shrink mechanism 22), forward link 36 and truck beam 34 are tilted, by virtue of their connection with upper tubular housing 26 and lower tubular housing 28, respectively. In some examples, longitudinal translation of lower tubular housing 28 with respect to upper tubular housing 26 causes a greater respective longitudinal translation of aft end region 136 of truck beam 34 with respect to upper tubular housing 26 (e.g., due to tilting of lever assembly 21). For example, longitudinal translation of aft end region 136 with respect to upper tubular housing 26 is at least 1.25 times greater, at least 1.5 times greater, at least 1.75 times greater, at least 2 times greater, at least 2.5 times greater, at least 3 times greater, and/or at least 5 times greater than the corresponding respective longitudinal translation of lower tubular housing 28 with respect to upper tubular housing 26, in some examples. Put another way, a shortening length, defined by the difference between an overall length 146 of aircraft landing gear structure 70 in the extended configuration (FIG. 5) and an overall length 147 of aircraft landing gear structure 70 in the retracted configuration (FIG. 6), may be greater than the difference between extended length 74 of strut assembly 71 in the extended configuration and retracted length 76 of strut assembly 71 in the retracted configuration.

Lower tubular housing 28 may include one or more lower tubular housing forks 148 extending from lower tubular housing 28. Lower tubular housing forks 148 may be angled towards a front end of the aircraft such that truck beam 34 does not contact upper tubular housing 26 in any of the configurations of strut assembly 71. Truck beam 34 may be pivotally coupled to lower tubular housing forks 148, such as via middle pivot joint 54, though in other examples, truck beam 34 may be pivotally coupled to another part of lower tubular housing 28. In some examples, lower tubular housing forks 148 may be pivotally coupled to a brake rod 150 that is pivotally coupled with respect to wheel hub 56 and/or a brake housing. Lever assembly 21 may be referred to as being "semi-levered" in some examples. Wheel assembly 20 is shown as a single axle wheel assembly, though other examples may include additional axles 55 and/or wheels/wheel hubs 56.

While strut assembly 71 is illustrated with lever assembly 21 according to the present disclosure in FIGS. 4-6, in other examples of aircraft landing gear structures different types of lever assemblies containing more or fewer links may be combined with a strut assembly according to the present disclosure (e.g., strut assembly 100 having shrink mechanism 22 and/or shrink mechanism 23).

Turning now to FIGS. 9-11, aircraft landing gear structure 152 (which is an example of aircraft landing gear structure 18) includes a strut assembly 154, lever assembly 21, and retract actuator 32, which also serves as shrink actuator 33. Strut assembly 154 may be any strut assembly, such as strut assembly 100, strut assembly 71, or a different strut assembly. Additionally or alternatively, aircraft landing gear structure 152 may include any assembly (e.g., lever assembly 21, or a different assembly) to couple strut assembly 154 to wheel assembly 20.

Retract actuator 32 is configured to transition strut assembly 154 between the extended configuration and the retracted configuration. Additionally, retract actuator 32 is configured to retract aircraft landing gear structure 152 into the aircraft for stowage during flight. In this manner, a single actuator (e.g., retract actuator 32) is configured to both shrink strut assembly 154 and also retract aircraft landing gear structure 152, as compared to prior art landing gear structures, which utilize separate actuators for these two different functions.

In the example of aircraft landing gear structure 152, retract actuator 32 is slaved to a shrink mechanism (e.g., shrink mechanism 22) that is configured to shrink strut assembly 154 from an extended configuration to a retracted configuration, such that shrink mechanism 22 and retract actuator 32 are mechanically linked. In other words, actuation of retract actuator 32 causes actuation of shrink mechanism 22 directly via a physical link between the two. Additionally, actuation of retract actuator 32 causes truck beam 34 of lever assembly 21 to tilt with respect to strut assembly 154, thereby raising wheel hub 56 of aircraft landing gear structure 152 with respect to upper tubular housing 26 of strut assembly 154.

FIGS. 10-11 illustrate a close-up, partial cut-away view of retract actuator 32 coupled to a shrink mechanism 22 that includes a locking link assembly 106, though in other examples, retract actuator 32 may be mechanically linked to a different shrink mechanism 22. Retract actuator 32 is configured to transition between a stowed configuration (FIG. 11), in which aircraft landing gear structure 152 is retracted into the aircraft for stowage, and a ground configuration (FIG. 10), in which aircraft landing gear structure 152 is positioned outside a wheel well of the aircraft. In the example of FIGS. 10-11, a drive link 156 couples locking link assembly 106 to retract actuator 32 via a retraction mechanism 166. In some examples, upper link 108 of locking link assembly 106 is coupled to retraction mechanism 166. Additionally or alternatively, lower link 110 of locking link assembly 106 is coupled to retraction mechanism 166 in some examples. In the example of FIGS. 10-11, drive link 156 couples retraction mechanism 166 to upper link 108 (though drive link 156 may be additionally or alternatively coupled to lower link 110, or to another component of shrink mechanism 22, in other examples). In this manner, actuation of retract actuator 32 transitions it between the stowed configuration and the ground configuration, and moves drive link 156 with respect to the aircraft and/or with respect to the upper tubular housing (e.g., upper tubular housing 26, though the same is not shown in FIGS. 10-11, for clarity), thereby causing locking link assembly 106 to transition from the lengthened configuration (FIG. 10) to the shortened configuration (FIG. 11). Such shortening of locking link assembly 106 raises upper bulkhead 38 and shrinks the strut assembly (e.g., strut assembly 154).

As shown in FIGS. 10-11, upper link 108 may be pivotally coupled to a fixed structure 158 of the aircraft (though the remainder of the aircraft is not shown, for clarity), such as via upper pin 116. Apex pin 118 pivotally couples upper link 108 and lower link 110 together in aircraft landing gear structure 152, and lower pin 120 pivotally couples lower link 110 to upper bulkhead 38 of strut assembly 154. In some examples, drive link 156 is coupled to locking link assembly 106 adjacent apex pin 118, as shown, though other arrangements and positions are also within the scope of the present disclosure. Drive link 156 may include a first drive link end region 160 and a second drive link end region 162 opposite first drive link end region 160. In some examples, drive link 156 is pivotally coupled to retraction mechanism 166 within first drive link end region 160, and is pivotally coupled to locking link assembly 106 (e.g., lower link 110) within second drive link end region 162.

Retraction mechanism 166 pivots about a retraction axis 164 in some examples, as it transitions between the stowed configuration and the ground configuration. Such pivoting about retraction axis 164 causes translation of drive link 156 with respect to retraction axis 164, in some examples. Such translation of drive link 156 actuates shrink mechanism 22 in some examples, thereby transitioning strut assembly 154 to the retracted configuration. In this manner, retract actuator 32 causes retraction of aircraft landing gear structure 152 into the aircraft via retraction mechanism 166. In some examples, pivoting retraction mechanism 166 about retraction axis 164 (e.g., transitioning retract actuator 32 to the stowed configuration) is caused by extension of retract actuator 32. Retraction mechanism 166 may be coupled to strut assembly 154 and/or to the aircraft itself, either directly or via one or more linking members. For example, one end region 168 of retraction mechanism 166 may be coupled to upper tubular housing 26, while an opposing end region 170 of retraction mechanism 166 may be coupled to retract actuator 32. Retraction axis 164 may be transverse to longitudinal axis 24 (shown in FIG. 10) of strut assembly 154, in some examples. In some examples, retraction mechanism 166 includes a walking beam. Retract actuator 32 and/or retraction mechanism 166 may include any suitable type of actuator or mechanism, such as a hydraulic actuator, a bell/crank, or any other suitable type of actuator or mechanism.

Figure 12:
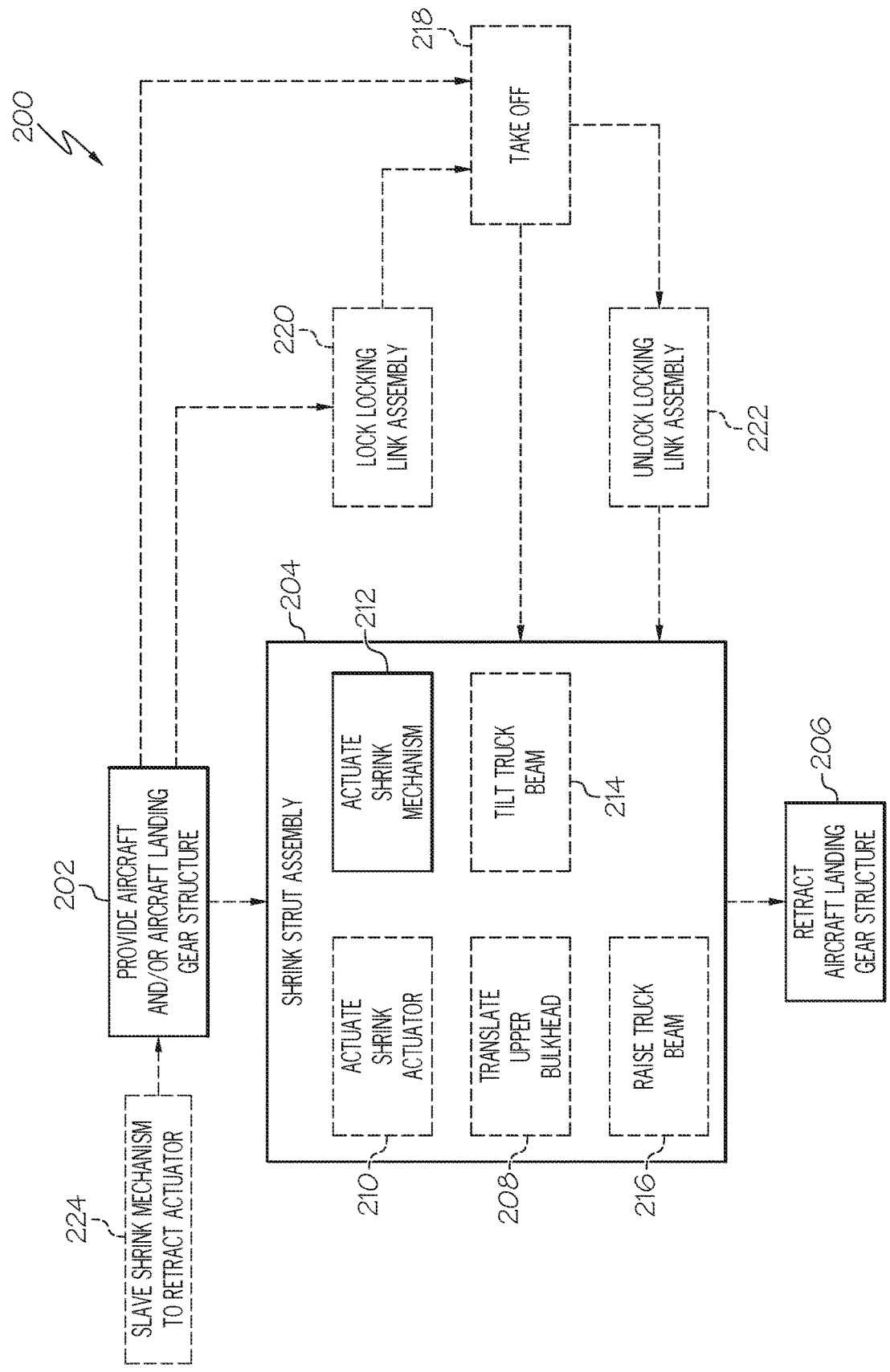
FIG. 12 is a flowchart schematically representing methods of retracting a strut assembly for stowing aircraft landing gear, according to the present disclosure.

FIG. 12 schematically provides a flowchart that represents illustrative, non-exclusive examples of methods 200 for retracting a strut assembly (e.g., strut assembly 100) and/or aircraft landing gear structure (e.g., aircraft landing gear structure 18) into an aircraft (e.g., aircraft 10) for stowage during flight, according to the present disclosure. In FIG. 12, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 12 are not limiting and other methods and steps are within the scope of the present disclosure, including methods having greater than or fewer than the number of steps illustrated, as understood from the discussions herein.

Methods 200 generally include providing the aircraft and/or aircraft landing gear structure at 202, shrinking the strut assembly of the aircraft landing gear structure at 204, and retracting the aircraft landing gear structure at 206. Providing the aircraft and/or aircraft landing gear structure at 202 may include providing any of the aircraft landing gear structures having any of the strut assemblies disclosed herein. Such strut assemblies and/or aircraft landing gear structures may be installed in existing aircraft (e.g. the aircraft may be retrofitted), or may be provided for use within an aircraft at the time of manufacturing. Presently disclosed strut assemblies and aircraft landing gear structures including the same may be provided separately from the aircraft in which they are to be used, or may be provided together with the aircraft. Providing the aircraft at 202 may include providing an aircraft with a plurality of strut assemblies and/or aircraft landing gear structures, and/or may include providing a plurality of strut assemblies and/or aircraft landing gear structures for use within an aircraft.

Shrinking the strut assembly at 204 generally includes reducing an overall length of the strut assembly, such as by transitioning the strut assembly from the extended configuration to the retracted configuration. In some examples, shrinking the strut assembly at 204 includes longitudinally translating an upper bulkhead (e.g., upper bulkhead 38) from a lower position to an upper position at 208, such that longitudinally translating the upper bulkhead mechanically causes translation of a lower tubular housing (e.g., lower tubular housing 28) of the strut assembly with respect to an upper tubular housing (e.g., upper tubular housing 26) of the strut assembly, thus placing the strut assembly in the retracted configuration. In some specific examples, translating the upper bulkhead at 208 mechanically causes longitudinal translation of a third tubular member (e.g., third tubular member 44, which may be orifice support tube 45, in some examples) and a corresponding third tubular member stop (e.g., third tubular member stop 46, which may be orifice plate flange 47, in some examples) while the third tubular member stop contacts and causes longitudinal translation of an inner tube stop (e.g., inner tube stop 48) of the lower tubular housing, thereby causing translation of the lower tubular housing to the retracted position. Generally, the shrinking the strut assembly at 204 (e.g., the translating the upper bulkhead at 208) is performed after takeoff of the aircraft (e.g., once the aircraft is in flight) at 218.

Retracting the aircraft landing gear structure at 206 generally includes retracting and stowing the aircraft landing gear structure within the aircraft during flight, such as within a wheel well of the aircraft, within a landing gear storage bay within the aircraft, and/or within a wheel storage bay within the aircraft. Retracting the aircraft landing gear structure at 206 may be performed by a retract actuator (e.g., retract actuator 32). In some methods 200, the retract actuator also actuates a shrink mechanism (e.g., shrink mechanism 22) that performs the shrinking the strut assembly at 204. In some examples, shrinking the strut assembly at 204 includes actuating a shrink actuator (e.g., shrink actuator 33, which may be the same actuator as retract actuator 32, in some examples) at 210, thereby actuating a shrink mechanism at 212 to shrink the strut assembly.

Retracting the aircraft landing gear structure at 206 may be performed after the shrinking the strut assembly at 204 in some examples, or may be performed substantially simultaneously (e.g., concurrently) with the shrinking the strut assembly at 204. In some examples, the shrinking the strut assembly at 204 and the retracting the aircraft landing gear structure at 206 may be initiated at the same time or by the same process, mechanism, or actuator, though the shrinking the strut assembly may be completed before the retracting the aircraft landing gear structure is completed, in some examples. Retracting the aircraft landing gear structure at 206 may include rotating the retract actuator about a retraction axis (e.g., retraction axis 164) in some methods.

In some examples, shrinking the strut assembly at 204 involves longitudinally translating the lower tubular housing of the strut assembly with respect to the upper tubular housing and pivoting a forward link of a lever assembly (e.g., forward link 36 of lever assembly 21) with respect to a truck beam (e.g., truck beam 34) of the lever assembly. In this manner, shrinking the strut assembly at 204 may include tilting the truck beam at 214 and/or raising the truck beam with respect to the upper tubular housing, at 216. Tilting the truck beam at 214 and raising the truck beam at 216 generally also result in raising a wheel of a wheel assembly (e.g., wheel hub 56 of wheel assembly 20) along with the truck beam.

Some methods 200 including locking a locking link assembly (e.g., locking link assembly 106) in a lengthened configuration at 220, which may retain the upper bulkhead of the strut assembly in its lower position both when the strut assembly is in the extended configuration and in the compressed configuration. Before shrinking the strut assembly at 204 (or substantially simultaneously therewith), the locking link assembly may be unlocked at 222 and transitioned to its shortened configuration, thereby translating the upper bulkhead to its upper position to move the strut assembly to the retracted configuration. In some methods 200, unlocking the locking link assembly 222 may be part of the shrinking the strut assembly at 204.

Methods 200 may include mechanically linking the shrink mechanism to the retract actuator at 224, such that the shrink mechanism is mechanically slaved to the retract actuator, and such that actuation of the retract actuator causes actuation of the shrink mechanism.

Figure 13:
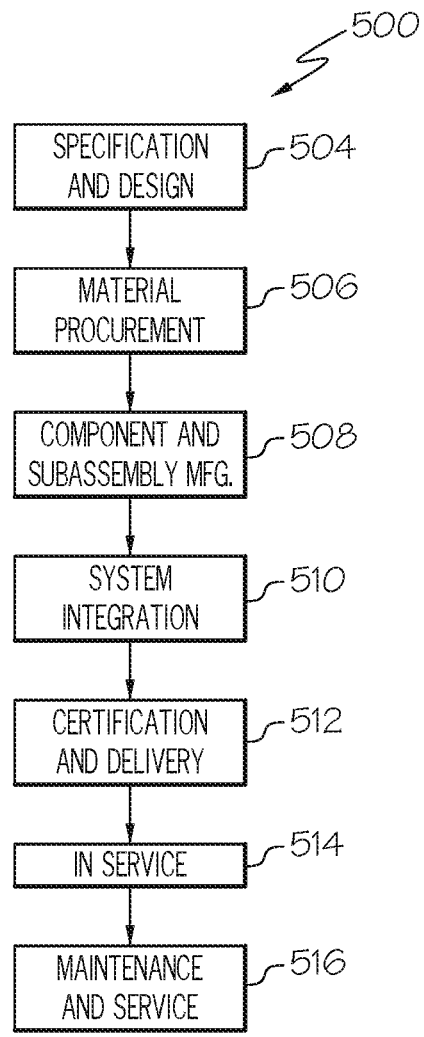
FIG. 13 is a flowchart schematically representing aircraft production and service methodology.
Figure 14:
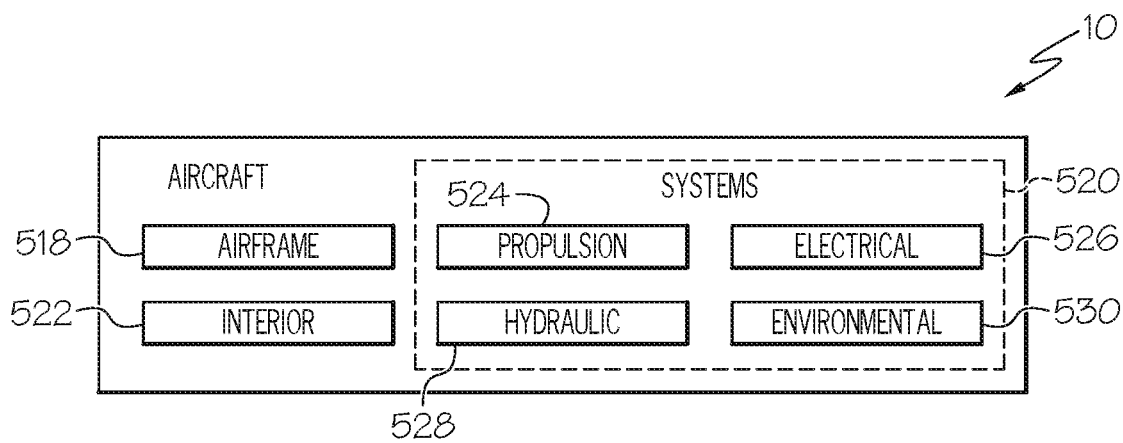
FIG. 14 is a block diagram schematically representing an aircraft.

Turning now to FIGS. 13-14, embodiments of the present disclosure may be described in the context of an aircraft manufacturing and service method 500 as shown in FIG. 13 and an aircraft 10 as shown in FIG. 14. During pre-production, exemplary method 500 may include specification and design 504 of the aircraft 10 and material procurement 506. During production, component and subassembly manufacturing 508 and system integration 510 of the aircraft 10 takes place. Thereafter, the aircraft 10 may go through certification and delivery 512 in order to be placed in service 514. While in service, the aircraft 10 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 10 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 500. For example, components or subassemblies corresponding to production process 508 may be fabricated or manufactured in a manner similar to components or subassemblies produced while the aircraft 10 is in service. Also, one or more apparatus embodiments, method embodiments, or a combination thereof may be utilized during the production stages 508 and 510, for example, by substantially expediting assembly of or reducing the cost of an aircraft 10. Similarly, one or more of apparatus embodiments, method embodiments, or a combination thereof may be utilized while the aircraft 10 is in service, for example and without limitation, to maintenance and service 516.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft landing gear structure for an aircraft, comprising:
   a strut assembly having a longitudinal axis, wherein the strut assembly is configured to transition between a compressed configuration in which the strut assembly has a compressed length when the strut assembly is weighted by the aircraft, an extended configuration in which the strut assembly has an extended length when the strut assembly is not weighted by the aircraft, and a retracted configuration for stowage of the aircraft landing gear structure within the aircraft and in which the strut assembly has a retracted length, wherein the compressed length and the retracted length are less than the extended length, and wherein the strut assembly comprises:
      an upper tubular housing;

a lower tubular housing operatively coupled to the upper tubular housing and configured to be longitudinally translated relative to the upper tubular housing, wherein the lower tubular housing is configured to be longitudinally translated between a compressed position and an extended position, wherein the lower tubular housing is in the compressed position when the strut assembly is in the compressed configuration, wherein the lower tubular housing is in the extended position when the strut assembly is in the extended configuration, wherein the lower tubular housing is further configured to be selectively and longitudinally translated to a retracted position, and wherein the lower tubular housing is in the retracted position when the strut assembly is in the retracted configuration; and a shrink mechanism contained within the upper tubular housing, wherein the shrink mechanism is contained within the upper tubular housing when the strut assembly is in the extended configuration and when the strut assembly is in the retracted configuration; and a lever assembly operatively coupled to the lower tubular housing of the strut assembly, the lever assembly comprising:

a forward link pivotally coupled to the upper tubular housing via a first link pivot joint; and a truck beam pivotally coupled to a second link pivot joint of the forward link, wherein the truck beam is further pivotally coupled to the lower tubular housing such that longitudinal translation of the lower tubular housing with respect to the upper tubular housing causes pivoting of the forward link and the truck beam with respect to one another, and wherein the shrink mechanism is configured to selectively and longitudinally translate the lower tubular housing with respect to the upper tubular housing, thereby causing pivoting of the forward link and the truck beam with respect to one another as the strut assembly is transitioned between the retracted configuration and the extended configuration.

2. The aircraft landing gear structure according to claim 1, wherein the truck beam is configured such that longitudinal translation of the lower tubular housing with respect to the upper tubular housing causes longitudinal translation of a middle pivot joint of the truck beam with respect to the upper tubular housing, wherein the middle pivot joint pivotally couples the truck beam to the lower tubular housing.

3. The aircraft landing gear structure according to claim 2, wherein the strut assembly further comprises one or more lower tubular housing forks extending from the lower tubular housing, wherein the lower tubular housing forks are angled towards a forward end of the aircraft such that the aircraft landing gear structure is configured such that the truck beam does not contact the upper tubular housing in any of the compressed configuration, the extended configuration, or the retracted configuration, and wherein the middle pivot joint pivotally couples the truck beam to the one or more lower tubular housing forks.

4. The aircraft landing gear structure according to claim 2, wherein the truck beam comprises a truck pivot point that is pivotally coupled to the second link pivot joint of the forward link, wherein the truck pivot point is positioned within a forward end region of the truck beam, wherein the truck beam is pivotally coupled to a wheel within an aft end region of the truck beam via an axle, and wherein the aft end region of the truck beam is opposite the forward end region of the truck beam, wherein the middle pivot joint of the truck beam is positioned between the truck pivot point of the truck beam and the aft end region of the truck beam.

5. The aircraft landing gear structure according to claim 4, wherein the truck beam and the forward link define a pivot angle, wherein a vertex of the pivot angle opens towards the lower tubular housing, wherein the pivot angle is formed by an intersection between a first line and a second line, wherein the first line intersects a center point of the first link pivot joint and a center point of the second link pivot joint, and wherein the second line intersects a center point of the truck pivot point and a center point of the axle, and wherein the pivot angle is smaller when the strut assembly is in the retracted configuration than when the strut assembly is in the extended configuration.

6. The aircraft landing gear structure according to claim 5, wherein the lever assembly is configured such that longitudinal translation of the lower tubular housing with respect to the upper tubular housing causes the pivot angle to change.

7. The aircraft landing gear structure according to claim 6, wherein the lever assembly is configured such that longitudinal translation of the lower tubular housing with respect to the upper tubular housing from the extended configuration towards the retracted configuration reduces the pivot angle, thereby tilting the truck beam and the forward link.

8. The aircraft landing gear structure according to claim 4, wherein the aircraft landing gear structure is configured such that longitudinally translating the lower tubular housing with respect to the upper tubular housing by a first distance causes longitudinal translation of the aft end region of the truck beam with respect to the upper tubular housing by a second distance, wherein the second distance is greater than the first distance.

9. The aircraft landing gear structure according to claim 1, wherein the strut assembly is configured such that longitudinally translating an upper bulkhead within the upper tubular housing from a lower position to an upper position mechanically causes translation of the lower tubular housing with respect to the upper tubular housing.

10. The aircraft landing gear structure according to claim 1, wherein the lever assembly is a single-axle lever assembly.

11. The aircraft landing gear structure according to claim 1, wherein the shrink mechanism is mechanically linked to a retract actuator configured to retract the aircraft landing gear structure into the aircraft by pivoting a retraction mechanism about a retraction axis, wherein the retract actuator is further configured to actuate the shrink mechanism to transition the strut assembly between the extended configuration and the retracted configuration, wherein the shrink mechanism comprises an upper link pivotally coupled to a lower link via an apex pin that defines a pivoting axis about which the lower link pivots when the shrink mechanism is actuated, and wherein the apex pin is arranged such that the pivoting axis is at a non-parallel angle with respect to the retraction axis.

12. An aircraft, comprising:
a fuselage;
a wing assembly operatively coupled to the fuselage, wherein one or more of the fuselage and the wing assembly defines one or more wheel wells, landing gear storage bays, or wheel storage bays; and
one or more of the aircraft landing gear structures according to claim 1 operatively coupled to one or more of the fuselage and the wing assembly, and configured to be stored within the one or more wheel wells, landing gear storage bays, or wheel storage bays during flight.

13. A method of retracting an aircraft landing gear structure for stowing within an aircraft, the method comprising:
providing the aircraft landing gear structure, wherein the aircraft landing gear structure comprises a strut assembly and a lever assembly, wherein the strut assembly is configured to transition between a compressed configuration in which the strut assembly has a compressed length when the strut assembly is weighted by the aircraft, an extended configuration in which the strut assembly has an extended length when the strut assembly is not weighted by the aircraft, and a retracted configuration for stowage of the aircraft landing gear structure within the aircraft and in which the strut assembly has a retracted length, wherein the compressed length and the retracted length are less than the extended length;
shrinking the strut assembly of the aircraft landing gear structure such that a lower tubular housing of the strut assembly is longitudinally translated with respect to an upper tubular housing of the strut assembly and such that a forward link of the lever assembly is pivoted with respect to a truck beam of the lever assembly, wherein shrinking the strut assembly is selectively performed by a shrink mechanism positioned within the upper tubular housing, wherein the shrink mechanism is contained within the upper tubular housing when the strut assembly is in the extended configuration and when the strut assembly is in the retracted configuration; and
retracting the aircraft landing gear structure into the aircraft and stowing the aircraft landing gear within the aircraft.

14. The method according to claim 13, wherein shrinking the strut assembly raises a wheel of a wheel assembly with respect to the upper tubular housing of the strut assembly.

15. The method according to claim 14, wherein shrinking the strut assembly transitions the strut assembly from an extended configuration, in which the strut assembly has an extended length when the strut assembly is not weighted by the aircraft, to a retracted configuration for stowage of the aircraft landing gear structure within the aircraft, in which the strut assembly has a retracted length, wherein the retracted length is less than the extended length.

16. The method according to claim 13, wherein the lever assembly is a single-axle lever assembly.

17. The method according to claim 13, wherein shrinking the strut assembly is selectively performed by actuation of the shrink mechanism by a shrink actuator, and wherein retracting the aircraft landing gear structure is selectively performed by the shrink actuator.

18. The method according to claim 13, wherein shrinking the strut assembly comprises longitudinally translating an upper bulkhead within the upper tubular housing from a lower position to an upper position, and wherein longitudinally translating the upper bulkhead mechanically causes translation of the lower tubular housing with respect to the upper tubular housing.

19. The method according to claim 13, wherein the lower tubular housing is configured to be longitudinally translated between a compressed position when the strut assembly is in the compressed configuration and an extended position when the strut assembly is in the extended configuration, wherein the lower tubular housing is further configured to be selectively and longitudinally translated to a retracted position when the strut assembly is in the retracted configuration, wherein the lever assembly is operatively coupled to the lower tubular housing of the strut assembly, wherein the forward link is pivotally coupled to the upper tubular housing via a first link pivot joint, wherein the truck beam is pivotally coupled to a second link pivot joint of the forward link, wherein the truck beam is further pivotally coupled to the lower tubular housing, and wherein the shrink mechanism is configured to selectively and longitudinally translate the lower tubular housing with respect to the upper tubular housing, such that shrinking the strut assembly comprises causing pivoting of the forward link and the truck beam with respect to one another as the strut assembly is transitioned between the retracted configuration and the extended configuration.

20. The method according to claim 13, wherein providing the aircraft landing gear structure comprises installing the aircraft landing gear structure in the aircraft as a retrofit.

* * * * *